US010608993B2

United States Patent
Bansal et al.

(10) Patent No.: US 10,608,993 B2
(45) Date of Patent: Mar. 31, 2020

(54) FIREWALL RULE MANAGEMENT

(71) Applicant: Nicira, Inc., Palo Alto, CA (US)

(72) Inventors: Kaushal Bansal, Pleasanton, CA (US);
Uday Masurekar, Sunnyvale, CA (US);
Serge Maskalik, Los Gatos, CA (US);
Shadab Shah, Sunnyvale, CA (US);
Aravind Srinivasan, Coimbatore (IN);
Minjal Agarwal, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 221 days.

(21) Appl. No.: 15/726,237

(22) Filed: Oct. 5, 2017

(65) Prior Publication Data

US 2018/0048623 A1 Feb. 15, 2018

Related U.S. Application Data

(62) Division of application No. 14/788,689, filed on Jun. 30, 2015, now Pat. No. 9,787,641.

(51) Int. Cl.
*H04L 29/06* (2006.01)
*G06F 9/455* (2018.01)

(52) U.S. Cl.
CPC .......... *H04L 63/0263* (2013.01); *G06F 9/455* (2013.01); *H04L 63/0218* (2013.01)

(58) Field of Classification Search
CPC .. H04L 63/0263; H04L 63/0218; G06F 9/455
USPC .......................................................... 726/11
See application file for complete search history.

(56) References Cited

U.S. PATENT DOCUMENTS

| | | | |
|---|---|---|---|
| 8,605,655 B1 | 12/2013 | Sahai et al. | |
| 9,215,213 B2 | 12/2015 | Bansal et al. | |
| 9,438,560 B2 | 9/2016 | Mohanty et al. | |
| 9,438,634 B1 | 9/2016 | Ross et al. | |
| 9,467,476 B1 | 10/2016 | Shieh et al. | |
| 9,787,641 B2 | 10/2017 | Bansal et al. | |
| 10,298,619 B2 | 5/2019 | Nimmagadda et al. | |
| 10,419,321 B2 | 9/2019 | Raman et al. | |
| 2003/0120955 A1 | 6/2003 | Bartal et al. | |
| 2005/0262554 A1 | 11/2005 | Brooks et al. | |
| 2007/0011734 A1 | 1/2007 | Balakrishnan et al. | |
| 2008/0037423 A1 | 2/2008 | Singh et al. | |
| 2008/0059596 A1 | 3/2008 | Ogawa | |
| 2008/0196102 A1 | 8/2008 | Roesch | |

(Continued)

OTHER PUBLICATIONS

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

*Primary Examiner* — Michael S McNally
(74) *Attorney, Agent, or Firm* — Adeli LLP

(57) ABSTRACT

Some embodiments provide a central firewall management system that can be used to manage different firewall devices from a single management interface. This management interface provides a uniform interface for defining different firewall rule sets and deploying these rules sets on different firewall devices (e.g., port-linked firewall engines, firewall service VMs, network-perimeter firewall devices, etc.). Also, this interface allows the location and/or behavior of the firewall rule sets to be dynamically modified. The management interface in some embodiments also provides controls for filtering and debugging firewall rules.

16 Claims, 22 Drawing Sheets

(56) References Cited

U.S. PATENT DOCUMENTS

| | | |
|---|---|---|
| 2008/0267186 A1 | 10/2008 | Boukis et al. |
| 2008/0282335 A1 | 11/2008 | Abzarian et al. |
| 2009/0300341 A1 | 12/2009 | Buehler et al. |
| 2010/0106764 A1* | 4/2010 | Chadwick .......... H04L 67/1002 709/202 |
| 2010/0107085 A1 | 4/2010 | Chadwick et al. |
| 2010/0325199 A1 | 12/2010 | Park et al. |
| 2010/0332262 A1 | 12/2010 | Horvitz et al. |
| 2012/0131591 A1 | 5/2012 | Moorthi et al. |
| 2012/0226808 A1 | 9/2012 | Morgan |
| 2013/0067090 A1 | 3/2013 | Batrouni et al. |
| 2013/0185413 A1 | 7/2013 | Beaty et al. |
| 2015/0135003 A1* | 5/2015 | Cota-Robles ....... G06F 11/1666 714/6.3 |
| 2015/0358391 A1 | 12/2015 | Moon et al. |
| 2016/0156591 A1* | 6/2016 | Zhou .................. H04L 63/0227 726/13 |
| 2016/0191463 A1 | 6/2016 | Mohanty et al. |
| 2016/0294987 A1 | 10/2016 | Tian et al. |
| 2016/0350683 A1 | 12/2016 | Bester et al. |
| 2017/0005986 A1 | 1/2017 | Bansal et al. |
| 2017/0078168 A1 | 3/2017 | Harris et al. |
| 2017/0207968 A1 | 7/2017 | Eicken et al. |
| 2017/0293994 A1 | 10/2017 | Li et al. |
| 2017/0324632 A1 | 11/2017 | Arora |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007127 A1 | 1/2018 | Salapura et al. |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0077119 A1 | 3/2018 | Fields et al. |
| 2018/0077189 A1 | 3/2018 | Doppke et al. |
| 2018/0084034 A1 | 3/2018 | Netto et al. |
| 2018/0088964 A1 | 3/2018 | Hussain et al. |
| 2018/0101371 A1 | 4/2018 | Flanakin et al. |
| 2018/0123907 A1 | 5/2018 | Raman et al. |
| 2018/0123939 A1 | 5/2018 | Raman et al. |
| 2018/0145999 A1 | 5/2018 | Ertugrul et al. |
| 2018/0167405 A1 | 6/2018 | Comay et al. |
| 2018/0176102 A1 | 6/2018 | Bansal et al. |
| 2018/0176252 A1 | 6/2018 | Nimmagadda et al. |
| 2018/0176261 A1 | 6/2018 | Bansal et al. |
| 2019/0180141 A1 | 6/2019 | Tiagi et al. |
| 2019/0182276 A1 | 6/2019 | Tiagi et al. |

* cited by examiner

Figure 6

*Top table (602):*

| No. | Name | Rule ID | Source | Destination | Service | Action |
|---|---|---|---|---|---|---|
| ▶ DLP/Firewall Partner Rules (Rule 1-2) | | | | | | |
| ✓1 | | 1029 | *any | Tenant-1-WebSe.. / Tenant-2-WebSe.. | SAP HTTP | Redirect TPSol-1 (FW/DLP)_T... |
| ✓2 | | 1028 | DC1 | *any | HTTP | Redirect TPSol-1 (FW/DLP)_T... |
| ▶ A/V Partner rules (Rule 3) | | | | | | |
| ✓3 | | 1027 | DC1 | Tenant-1 / Tenant-3 | *any | Redirect TPSol-3 (AV/File)_TP... |
| ▶ IDS/IPS Partner Rules (Rule 4) | | | | | | |
| ✓4 | | 1026 | *any | Tenant-2 | *any | Redirect TPSol-2 (IDS/IPS)_TP... |
| Default Section | | | | | | |

Firewall > Configuration > General | Ethernet | Deep Packet Firewall (416)

*Bottom table (604):* (same layout, with popup)

Action: Redirect
Redirect To: TPSol-1(FW/DLP)...
  - TPSol-1(FW/DLP)_TPSol1
  - TPSol-2(IDS/IPS)_TPSol-2
  - TPSol-3(AV/File)_TPSol-3(
Direction:
Log:
Comments:
[OK] [Cancel]

*Figure 7*

1205 — High Level Firewall Rules with Higher Level AppliedTo Identifiers

| Source | Source Port | Destination | Destination Port | Service | AppliedTo | Action |
|---|---|---|---|---|---|---|
| WS1 | | DBS1 | | Any | Compute Cluster X | Allow |
| | | | | | | |
| Any | | Blacklist | | Any | Datacenter Y | Deny |
| AS10 | | Any | | http | Logical Switch Z | Deny |

1210 — Low Level Firewall Rules with Lower Level AppliedTo Identifiers

| Source | Source Port | Destination | Destination Port | Service | AppliedTo | Action |
|---|---|---|---|---|---|---|
| WS1 | | DBS1 | | Any | VNIC 1, VNIC A… | Allow |
| | | | | | | |
| Any | | Blacklist | | Any | * | Deny |
| AS10 | | Any | | http | VNIC M, … | Deny |

1212

1215 — Host Level Rule Tables

| Source | Source Port | Destination | Destination Port | Service | AppliedTo | Action |
|---|---|---|---|---|---|---|
| WS1 | | DBS1 | | Any | VNIC A… | Deny |
| | | | | | | |

1220 — VNIC Level Rule Table

| Source | Source Port | Destination | Destination Port | Service | Action |
|---|---|---|---|---|---|
| WS1 | | DBS1 | | Any | Deny |
| | | | | | |

*Figure 12*

FIREWALL RULE MANAGEMENT

CLAIM OF BENEFIT TO PRIOR APPLICATIONS

This application is a continuation application of U.S. patent application Ser. No. 14/788,689, filed Jun. 30, 2015, and now published as U.S. Patent Publication 2017/0005986. U.S. patent application Ser. No. 14/788,689, now published as U.S. Patent Publication 2017/0005986, is incorporated herein by reference.

BACKGROUND

Forwarding elements in a network typically enforce permissive rules that specify how the traffic in network should flow. On the other hand, firewall rules in the network define the type of traffic that can flow through the network. Today, networks typically enforce firewall rules by using one or more hardware appliances and/or software firewall engines, such as service virtual machines (VMs) or firewall engines linked to software ports on host computers.

With logical networking space increasing drastically in software-defined datacenters, demand for traffic filtering via firewalls is increasing. While conventional firewalls provide a means to filter the traffic going through them, their location (e.g., perimeter versus port) and behavior (e.g., simple packet filtering, proxy server, stateful firewall, and deep packet inspection) cannot be easily be changed dynamically, in order to ensure that all traffic pass through them.

Moreover, existing firewall solutions lack adequate controls for identifying in a granular fashion the different sets of ports that are to be assigned the different sets of firewall rules. This problem becomes worse when different enforcements schemes are utilized, such as enforcement rules that restrict east-west traffic (e.g., L3 firewall rules that restrict routing within the datacenter) and north-south traffic (e.g., L3 firewall rules that restrict traffic coming into or going out of the datacenter). This problem is especially acute when third party vendor solutions with different management interfaces are used to define these different enforcement schemes.

BRIEF SUMMARY

Some embodiments provide a central firewall management system that can be used to manage different firewall devices from a single management interface. This management interface provides a uniform interface for defining different firewall rule sets and deploying these rules sets on different firewall devices (e.g., port-linked firewall engines, firewall service VMs, network-perimeter firewall devices, etc.). Also, this interface allows the location and/or behavior of the firewall rule sets to be dynamically modified. The management interface in some embodiments also provides controls for filtering and debugging firewall rules.

In some embodiments, this interface provides robust controls for granularly defining the enforcement points (e.g., the ports) at which the firewall rule sets are applied. The interface in some embodiments allows a user to specify a set of enforcement points in a firewall rule definition along with the standard data tuples (e.g., source IP, destination IP, source port, destination port, and protocol) that are used to match the firewall rule to the packet header attributes. In other words, to provide the ability to specify a set of enforcement nodes in the network at which a particular firewall should be enforced, the management interface of some embodiments adds an extra tuple (referred to below as the AppliedTo tuple) to a firewall rule. This added AppliedTo tuple can specify the set of enforcement points at which the firewall rule has to be applied (i.e., enforced).

In some embodiments, the AppliedTo tuple can be configured to identify the set of enforcement point identifiers in terms of network constructs and/or compute constructs. Different embodiments provide different sets of network and compute constructs for use in the AppliedTo tuples of the firewall rules. Examples of such constructs includes (1) individual or set of VNICs or VMs, (2) compute constructs, such as hosts, compute clusters, datacenters, etc., that represent grouping of VMs or hosts in a virtualized or nonvirtualized environment, (3) network elements, such as physical forwarding elements (e.g., physical switches, physical routers, etc.), logical forwarding elements (e.g., logical switches, logical routers, etc.), other managed appliances, unmanaged third-party appliances (e.g., third party firewalls), and/or combination of such elements, and (4) security groups that are formed by a set of one or more VNICs, VMs, hosts, compute constructs and/or network constructs.

In some embodiments, the AppliedTo tuple can also be set to a wildcard value, which signifies all possible values for the AppliedTo tuple (e.g., all VNICs). In some embodiments, one or more of the compute constructs, network constructs and security constructs can be specified as dynamic grouping constructs that can have members (e.g., forwarding elements, hosts, VNICs, etc.) dynamically added and/or removed from them.

The management interface of some embodiments distributes the AppliedTo firewall rules to various firewall-enforcing devices. In some cases, each firewall-enforcing device is a firewall enforcement node, while in other cases each firewall-enforcing device connects to one or more firewall enforcement nodes (i.e., enforcement points) and/or enforces the firewall rules for one or more firewall enforcement nodes. In some embodiments, the management interface distributes to each firewall-enforcing device only the AppliedTo firewall rules that pertain to that device. In other words, the management interface of some embodiments filters out the specified AppliedTo firewall rules that do not relate to each firewall-enforcing device from the set of firewall rules that it distributes to the device.

In some embodiments, these firewall-enforcing devices include hosts on which multiple VMs execute. In these or other embodiments, the network nodes that receive the AppliedTo firewall rules, include other types of firewall-enforcing devices. In some embodiments, the management interface distributes some of the AppliedTo firewall rules to some of the nodes with the AppliedTo tuples, while distributing other firewall rules to other nodes without the AppliedTo tuples. For instance, in some embodiments, the management interface distributes the AppliedTo firewall rules to hosts with one or more executing VMs, while distributing non-AppliedTo firewall rules to one or more third party appliances that cannot process AppliedTo firewall rules. In other embodiments, however, the management interface distributes AppliedTo firewall rules to some or all third party appliances, as these appliances are able to process AppliedTo firewall rules.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 6 illustrates the firewall management console after the deep packet firewall tab has been selected.

FIG. 7 present a filter window of the management console of some embodiments.

FIG. 12 illustrates several examples of rule tables.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a central firewall management system that can be used to manage different firewall engines with different rule sets on different enforcement points from a single management console. This management console is a uniform management interface for defining different firewall rule sets (e.g., for different tenants, for different networks, for different sub-networks of the same tenant, etc.) and deploying these rules sets on different firewall devices. The firewall devices can differ as to their type (e.g., port-linked firewall engines, firewall service VMs (SVMs), network-perimeter firewall device, etc.), and/or as to their vendor (e.g., firewall engines provided by the compute and/or network virtualization platform vendor, SVM of firewall vendor, application gateway from another vendor). The management console of some embodiments allows the location and/or behavior of the firewall rule sets to be dynamically modified. Also, the management console in some embodiments provides controls for filtering and debugging firewall rules.

In some embodiments, the firewall management console provides robust controls for granularly defining the enforcement points (e.g., the ports, SVMs, hosts, network perimeter firewall devices, etc.) at which the firewall rule sets are applied. The uniform interface of the firewall management system of some embodiments allows firewall rules to be defined for traffic flowing in and out of a datacenter as well as within the datacenter. In some embodiments, this system allows firewall rules to be defined by reference to traditional packet header attributes (e.g., the five tuples: source IP address, source port, destination IP address, destination port, and protocol) and one extra AppliedTo tuple. The AppliedTo parameter provides the user with an ability to define the enforcement point in the rule itself. These enforcement points can be port-level firewall engines, perimeter based firewall engines (such as a network perimeter node devices), deep-packet inspecting firewall appliances, etc.

Figure 1:
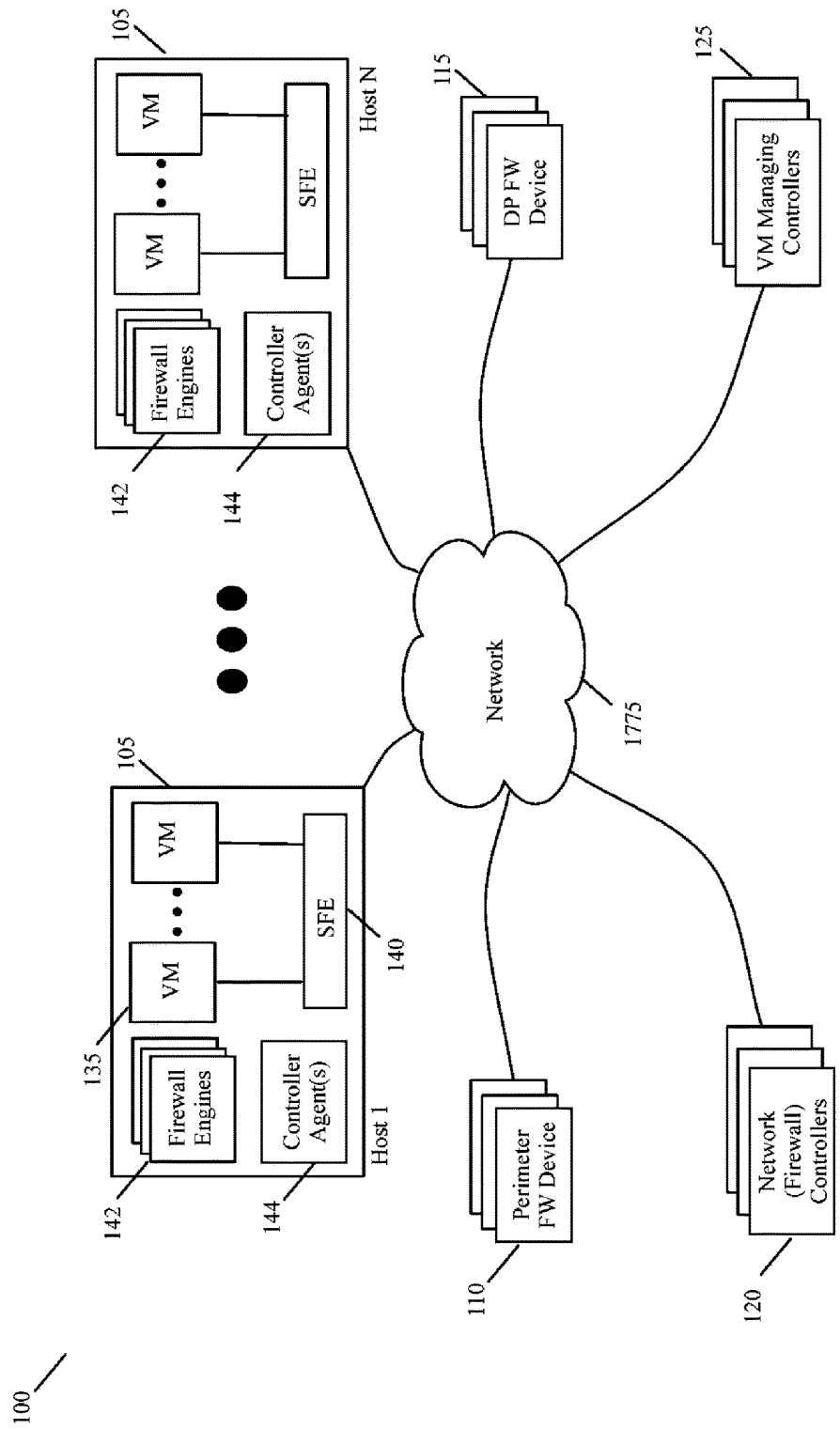
FIG. 1 illustrates a system that uses the central firewall management interface of some embodiments of the invention.

FIG. 1 illustrates a system 100 that uses the central firewall management interface 100 of some embodiments of the invention. As shown, this system includes multiple hosts 105, network perimeter firewall devices 110, deep-packet (DP) firewall devices 115, a set of network controllers 120, and a set of one or more VM managing controllers 125. Each host 110 executes (1) one or more VMs 135, (2) a software forwarding element 140 for communicatively coupling the VMs to other VMs on the host or on other hosts, (3) one or more firewall engines 142 for processing firewall rules for packets sent by or received for the VMs, and (4) one or more controller agents 144 for interacting with the controllers 110 and 115 to configure VMs and logical networks. This host architecture will be further described below by reference to FIGS. 13 and 18 for some embodiments of the invention.

As shown in FIG. 1, the hosts 105, the controllers 120 and 125, firewall devices 110, 115 and 150 communicatively couple through a network 175. In some embodiments, the system is implemented in a datacenter and the network 175 is the network fabric (e.g., switches, routers, wiring, etc.) that connects the various components. The network 175 can include a local area network (LAN), a wide area network (WAN) or even a network of networks (e.g., Internet) when the system 100 spans multiple sites.

The VM managing controller set 125 provide control and management functionality for defining (e.g., allocating or instantiating) and managing one or more VMs on each host. The network controller set 120 in some embodiments provide control and management functionality for defining and managing multiple logical networks that are defined on the common software forwarding elements of the hosts. As further described below, the software forwarding elements (SFEs) 140 in some embodiments can be configured to implement different logical forwarding elements (LFEs) for different logical networks of different tenants, users, departments, etc. that use the same shared compute and networking resources.

The network controller set 120 includes one or more controllers that provide the central management console through which the firewall rules can be defined by network administrator(s). The network controller set 120 then processes the received firewall rules and distributes them to the various firewall devices in the system 100. This controller set allows firewall rules to be defined for various physical and/or logical enforcement points in the network.

The network controller set 120 also defines and distributes firewall rules for (1) host-level firewall engines 142 that implement a distributed firewall engine for each tenant, (2) network perimeter firewall devices 110 (e.g., perimeter firewall VMs, gateways or appliances) that apply firewall rules at the network boundaries (e.g., physical or logical L3 boundaries), and (3) deep-packet firewall appliances that enforce L4-L7 firewall rules that process packets based on their L4-L7 header values. In some embodiments, the perimeter firewall devices are computing devices on which firewall engines. These computing devices (i.e., the perimeter firewall devices) in some embodiments do not execute any VMs. Also, in some embodiments, the computing devices execute software forwarding elements, such as software switches and/or software routers.

In some embodiments, the controller set 120 can distribute firewall rules to other firewall engines and devices, such as firewall service VMs (SVMs) and third party firewall appliances. Firewall devices can be classified in terms of how they filter traffic and/or where they filter traffic. For instance, firewall engines can be classified as (1) stateless firewalls that perform high-throughput, simple packet filtering without maintaining session information (e.g., TCP/UDP sessions), (2) stateful firewalls that typically perform connection tracking (e.g., TCP/UDP sessions tracking), and (3) application level gateways that perform more advanced L4-L7 firewall rule processing. Firewall engines can also be classified in terms of where they are located in the network, such as (1) port-level firewall engines that apply firewall rules after it leaves a virtualized port or before it is supplied to the virtualized port, and (2) perimeter firewalls at the network boundaries. The network controller set 120 can distribute firewall rules to any of the above-described firewalls.

Figure 2:
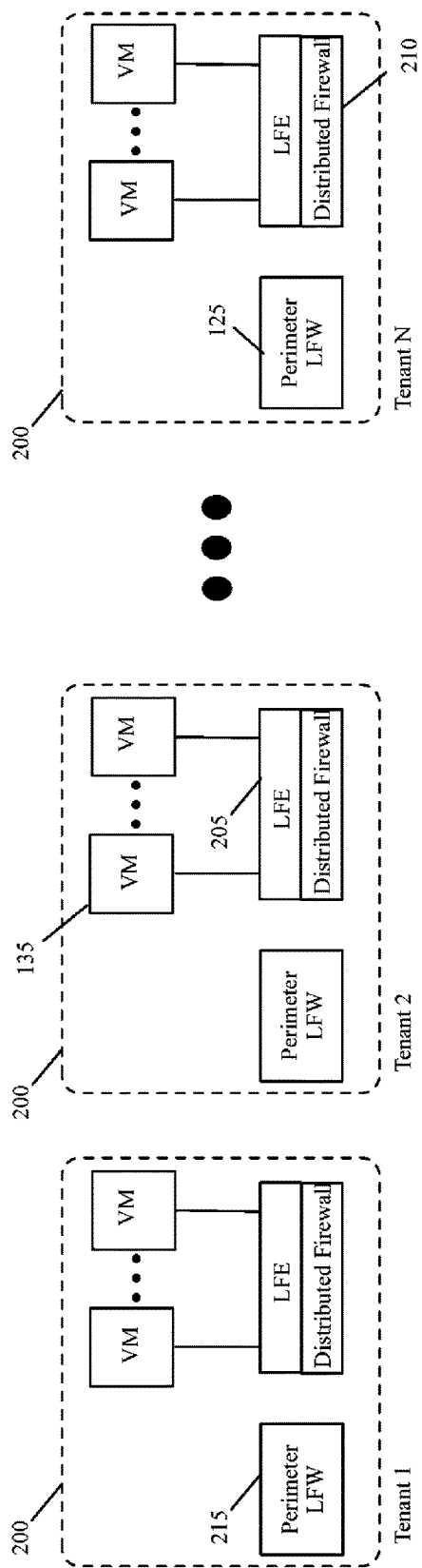
FIG. 2 illustrates one example of the different firewalls that the network controller set of some embodiments can configure.

FIG. 2 illustrates one example of the different firewalls that the network controller set 120 can define for the system 100 of FIG. 1. In this example, the network controller set 120 allows N logical networks for N tenants to be created on the shared physical network infrastructure. FIG. 2 illustrates several logical constructs that the network controller set can create for the N logical networks. As shown, each logical network 200 in this example includes a logical forwarding element (LFE) 205, a distributed firewall 210, a perimeter logical firewall (LFW) 215. An LFE of a logical network can span two or more SFEs 140 executing on two or more hosts 105 to connect VMs of the logical network. The distributed firewall engine 210 of the logical network is formed by the host firewall engines that enforce firewall rules on packets sent from and/or received for the VMs of the logical network. The perimeter logical firewall 215 of the logical network is formed by one or more perimeter firewall devices 110 that enforce firewall rules on packets sent by and/or received for the VMs of the logical network. The packets of each logical network's VMs can also be sent to firewall SVMs and/or DP firewall devices for additional firewall rule processing.

Each firewall enforcement point that receives (directly or indirectly) firewall rules or rule definitions from the network controller set 120 maintain its firewall rules in its own respective firewall rule table. The firewall management console of some embodiments allows an administrator to update the firewall rule tables at the different enforcement points through one common interface. The administrator may want to configure a certain set of common rules on all perimeter firewall devices. The system allows the administrator to do this without the need to replicate the same configuration at all perimeter firewall devices. By allowing the administrator to provide one firewall rule configuration set for all perimeter firewall devices, the system allows the administrator to avoid the complexity of defining and modifying such configuration as the number of perimeter firewall devices increases and/or when some of these rules also have to be enforced at the port-level firewall engines 142 or DP firewall devices 115.

In some embodiments, the controller set 120 allows an administrator to define a firewall rule by reference to an AppliedTo data tuple. For example, to allow the administrator to provide one firewall rule for several related or unrelated enforcement points that are associated with one or more networks, the controller set allows the administrator to define a firewall rule in the following format:

```
FROM: source_ip:X; source_port: Y
TO: destination_ip:A; destination_port: B
APPLIES_TO: all perimeter FWs, all_VMs
ACTION: Drop.
```

This rule specifies that it needs to be enforced at all perimeter firewall nodes 110 and all port-level firewall engine 142 that are associated with the VMs of the administrator's network. This rule indicates that packets that are sent from source port Y of source IP X to destination port B of destination IP A, should be dropped. After receiving this rule, the network controller set 120 converts this rule into several rules that it distributes to the firewall rule tables of the port-level firewall engines 142 and perimeter node firewalls 110. When only one logical network can send packets from source IP X to destination IP A, the controller set 120 only generates firewall rules for port-level firewall engines that enforce firewall rules for the particular logical network.

The above-described firewall rule format achieves three things. First, the administrator can write a single rule that gets applied to different enforcement points of same type. Second, the administrator can write a single rule that will be applied to different enforcement points of different type. Third, by reviewing firewall rules that are defined in one common format for different enforcement points and different types of firewalls, the administrator can easily view and decipher the complete protection profile for one or more logical networks and/or for the datacenter.

Figure 3:
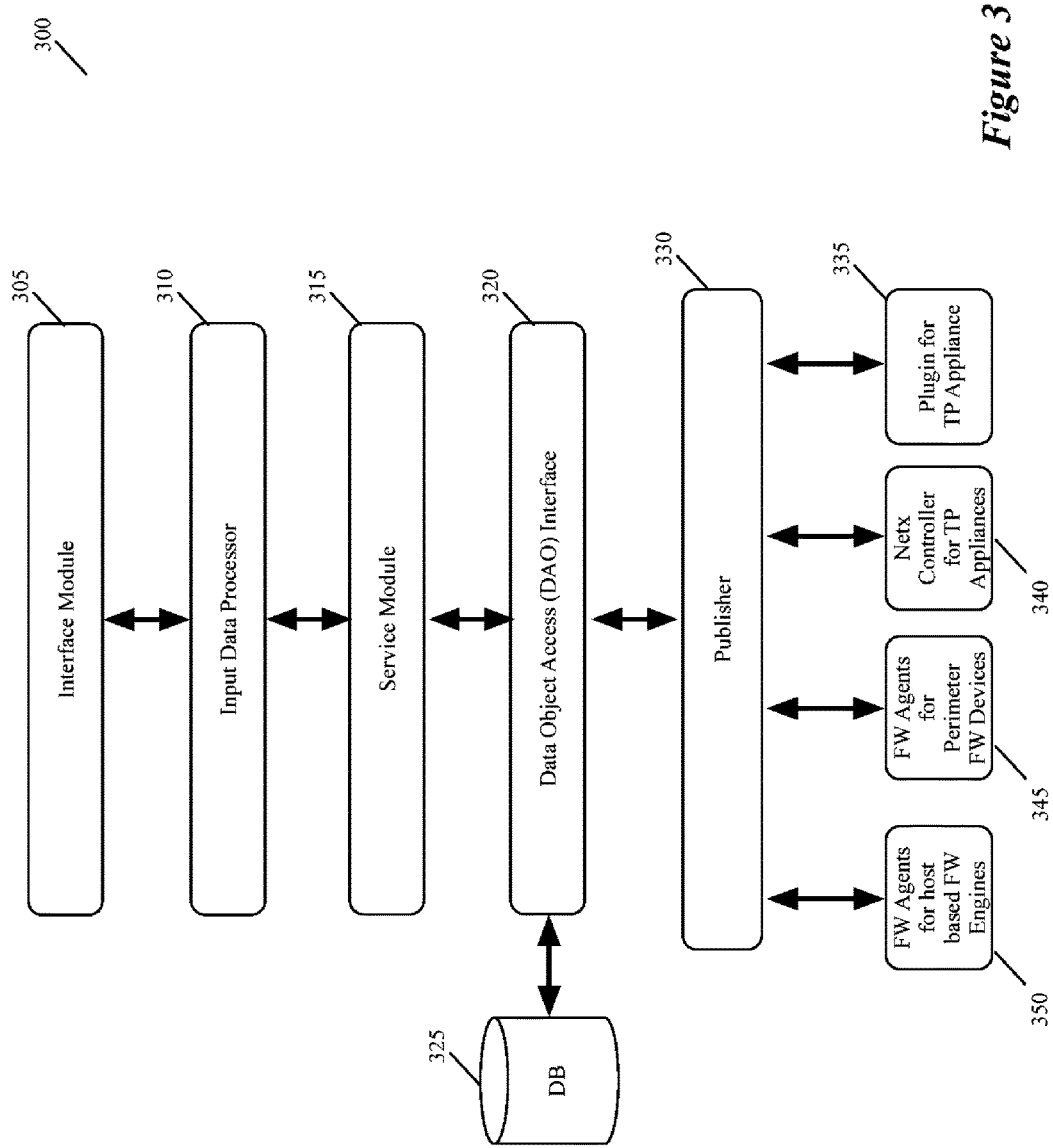
FIG. 3 illustrates a firewall management architecture of the firewall management module of the network controller set of some embodiments.

FIG. 3 illustrates a firewall management architecture 300 of the firewall management module of the network controller set 120 of some embodiments. As shown, this architecture includes an input interface 305, an input data processor 310, a service module 315, a data object access (DAO) interface 320, a persistence data storage 325, and a publisher 330. In this architecture, a user can define firewall rules through the firewall management console that is provided by the interface module 305. Through this interface 305, the firewall management system 300 can also receive firewall rules through web service protocols, such a REST (Representational State Transfer) web service protocol.

The interface module 305 passes the user provided firewall rule configuration to input data processor 310, which converts user configuration data from the user level format to a system level format. The input data processor in some embodiments applies validation rules to the received configuration data to validate the provided data. In some embodiments, this data processor also performs other operations, such as license checks, authorization, etc.

The service interface 315 takes the converted user input configuration data and performs a variety of services on this data, including audit logging and core business logic. Audit logging is used in some embodiments to identify when, who and how firewall rules were defined and/or modified. In addition, the service interface also provides the API interface to the user configuration data and firewall configuration data that is stored in the persistence data storage 325. The persistence data storage 325 is a relational database in some embodiments.

As shown, the service interface communicates with the persistence data storage 325 through the DAO interface 320. The DAO interface 320 abstracts away the details of the data structure used by the persistence data storage 325 from the modules (service interface 315 and publisher 330) that access this data storage. In other words, the DAO interface provides a high level abstraction to the system 300 logic (service interface 315 and publisher 330) that access the persistence data storage 325. One advantage of this abstraction is that the persistence data storage can be modified without affecting the logic that uses it. All that is needed in this situation is to update the DAO interface to work with the modified persistence data storage.

Once the desired user configuration data is persisted in the persistence data storage, the publisher 330 builds smaller rule sets for the various enforcement points in the network. To build these smaller rule sets, the publisher 330 uses the AppliedTo parameters of the specified rules. After building the smaller rule sets, the publisher distributes the rule sets to their respective enforcement points. In case of a port-linked firewall engines, the publisher sends the rule sets to the firewall agents 350 that execute on the host computing devices over a message bus. For network perimeter firewall nodes, the publisher distributes the firewall rule sets to the control plane of respective perimeter nodes through firewall agents 345 on these nodes. For third party solution (e.g., firewall appliances or proxy based application gateways), the publisher distributes the firewall rule sets through other interfaces, such as a NetX controller 340.

The layered architecture 300 of FIG. 3 provides an extensible, robust distributed firewall solution. Its extensibility allows a new enforcement point to be introduced by adding a new plugin 335, as shown in FIG. 3. No other layer needs to changed. In addition, this architecture is a distributed solution from enforcement point of view yet centralized from a management perspective. This architecture is also robust as it does not have a single point of failure. If an enforcement point goes down, it does not impact the rest of the system. Also, this architecture is not tied to any firewall vendor. If a customer wants to switch from one vendor specific solution to another vendor specific solution, it just need to make changes in the lower layer without suffering any impact from the configuration migration.

This architecture is also highly useful for debugging, as it provides a single interface that can be used to identify conflicting rules in the system. This is because a user (e.g., an administrator of a service provider, tenant, enterprise, etc.) can use firewall sections and AppliedTo data tuple to slice and dice the firewall configurations in a way that he wants to define filtering of traffic in the datacenter.

One example of a schema definition of a firewall rule over REST web services is as follows:

```
<xs:complexType name="FirewallRuleDto">
    <xs:sequence>
        <xs:element name="appliedToList" type="AppliedToListDto" />
        <xs:element name="sources" type="FirewallSourcesDto" />
        <xs:element name="destination"
type="FirewallDestinationsDto" />
        <xs:element name="services" type= "FirewallServicesDto" />
        <xs:element name="action" type="xs:string" />
        <xs:element name="logged" type="xs:boolean" />
        <xs:element name="notes" type= "xs:string" minOccurs="0"
/>
    </xs:sequence>
    <xs:attribute name= "id" type="xs:long" use="optional" />
    <xs:attribute name="disabled" type="xs:boolean" use="optional" />
    <xs:attribute name="precedence" type="xs:string" use="optional" />
    <xs:attribute name="tag" type="xs:string" use="optional" />
    <xs:element name="siProfile" type="BasicDomainObjectInfo" />
</xs:complexType>
<xs:complexType name="AppliedToListDto">
    <xs:sequence>
        <xs:element name="appliedTo" type="ObjectInfoDto"
            maxOccurs="unbounded" minOccurs="0" />
    </xs:sequence>
</xs:complexType>
<xs:complexType name="ObjectInfoDto">
    <xs:sequence>
        <xs:element type="xs:string" name="value" />
        <xs:element type="xs:string" name="name"
minOccurs="0"/>
        < xs:element type="xs:string" name="type"
minOccurs="0" />
        < xs:element type="xs:string" name="is Valid"
minOccurs="0" />
    </xs:sequence>
</xs:complexType>
```

In this schema, the AppliedTo object list under firewall rule allows a user to choose various enforcement points like distribute firewalls (e.g., formed by the host firewall engines), perimeter firewall devices, application level gateways, etc.

Figure 4:
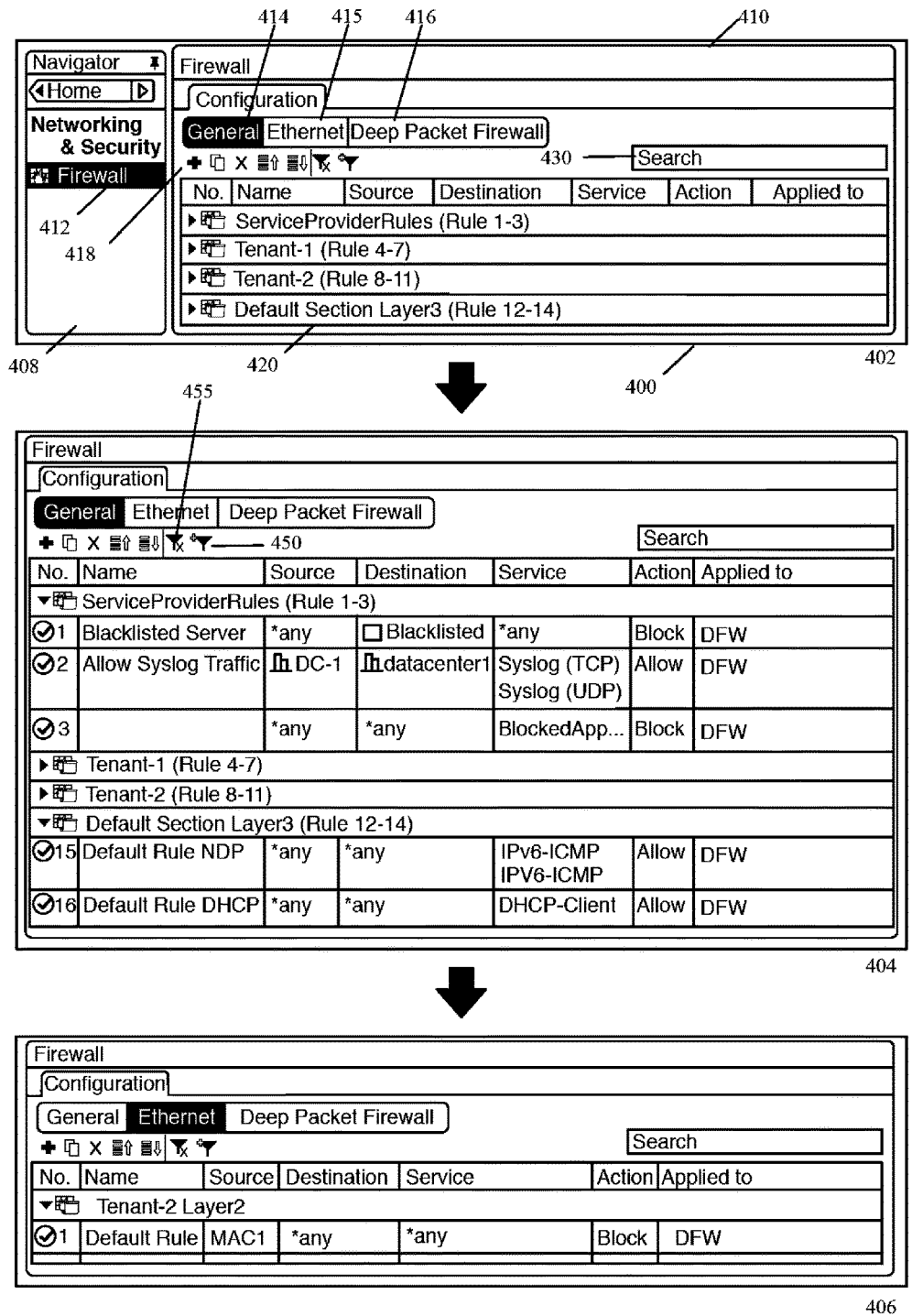
FIG. 4 illustrates three operational stages of a firewall management console UI of some embodiments.

The user interface (UI) of the firewall management console of some embodiments will now be described by reference to FIGS. 4-8. FIG. 4 illustrates three operational stages 402, 404 and 406 of a firewall management console UI 400 of some embodiments. The first stage 402 shows a navigation section 408 and a configuration-control section 410 of this console. The navigation section 408 displays a plurality of controls (not shown) for specifying compute constructs (such as VMs, compute clusters, etc.) and specifying network constructs (such as logical switches, logical routers, etc.). In FIG. 4, the navigator section only shows the firewall control 412 as this control is germane to the firewall discussion below.

As shown, selection of the control 412 causes configuration-control section 410 to display a firewall configuration pane that displays information and UI controls relating to the firewall rules for a datacenter. The firewall configuration pane includes (1) a rule section 420 that lists the firewall rules, and (2) three tabs 414, 415, 416 for displaying general firewall rules, Ethernet-based firewall rules, and deep-packet firewall rules in the rule section list. This pane also has a UI control section 418 that includes (1) controls for adding firewall rules, (2) copying firewall rules, (3) deleting firewall rules, (4) moving firewall rules up and down in the rule section list being displayed, (5) applying filters to filter out rules in the rule section list that do not meet one or more filtering criteria, and (6) removing filters. The control for applying the filter is control 450 while the control for removing the filter is the control 455. The filter control 450 allows a user to search for firewall rules that meet certain criteria.

The first stage 402 shows the general rule tab 414 selected and the general firewall rules (e.g., rules that will eventually be resolved by reference to L3/L4 parameters) displayed in the rule section list 420. In this stage, the rules are displayed in a collapsed form that shows four closed folders of firewall rules. These folders are service provider rules for a datacenter, rules for a first tenant, rules for a second tenant and default rules for the datacenter. The second stage 404 shows two of these folders (the service provider folder and the default rule folder) opened (expanded) to display the rules that they contain. The third stage 406 illustrates the selection of the Ethernet rules tab 415. As shown, selection of this tab causes the rule section 420 to show Ethernet firewall rules that are defined by reference to L2 parameters.

As shown in the stages 402-406 of FIG. 4, the firewall management console 400 includes a search field 430. A user can enter search strings in this field. Based on an entered search string, the management console 400 filters the firewall rules displayed in the rule section 420 to show only firewall rules that match the search string in some way. This search operation is one way that the console 400 allows a user to filter to firewall rules. The console 400 provides another way to perform filter operations by using filter control 440 in the UI control section 418, as further described below.

As shown in the second and third stages 404 and 406, each rules in the rule section 420 is defined in terms of seven tuples, which are the rule number, rule name, source tuple, destination tuple, service tuple, action tuple, and AppliedTo tuple. In some embodiments, the source and destination tuples can be used to specify source and destination header values of data messages for which the firewall process the firewall rules (i.e., the data messages that have their header values compared to the firewall rule source, destination and service tuples). For general firewall rules, these header values can specified in terms of IP addresses and/or port values (e.g., TCP, UDP, or other L4 port values). For Ethernet firewall rules, these header values can be specified in terms of the data message L2 parameter values, such as MAC addresses, L2 services (protocols), etc.

In some embodiments, the service tuple is used to define services that the data messages are using. As shown in the second stage 404, the firewall management console 400 of some embodiments allows the source, destination and service tuples to be defined at various level of granularity because this console is supported by a backend engine that resolves higher level tuple values (e.g., datacenter, compute cluster, logical switch, logical router, higher level service constructs) into lower level value (e.g., IP addresses, MAC addresses, service protocol names, etc.).

The action tuple of each firewall rule specify the action to perform with respect to a data message that has header values that match the rule's message matching tuples (e.g., the source, destination and service tuples). Examples of action tuple values include allow, deny (also called drop or block), re-direct, etc.

The AppliedTo tuple of each firewall rule allows a set of firewall enforcement points in the network to be defined for the rule. Examples of such enforcement points include host-level firewall engines and perimeter firewall devices. Like the source, destination and service data tuples, the AppliedTo tuple in some embodiments can be defined in terms of high or low level constructs, as the firewall management console's backend engine resolves the high level constructs to lower level constructs. In some embodiments, firewall rules for deep-packet inspecting firewall devices can be specified through the tab 416, as further described below.

Figure 5:
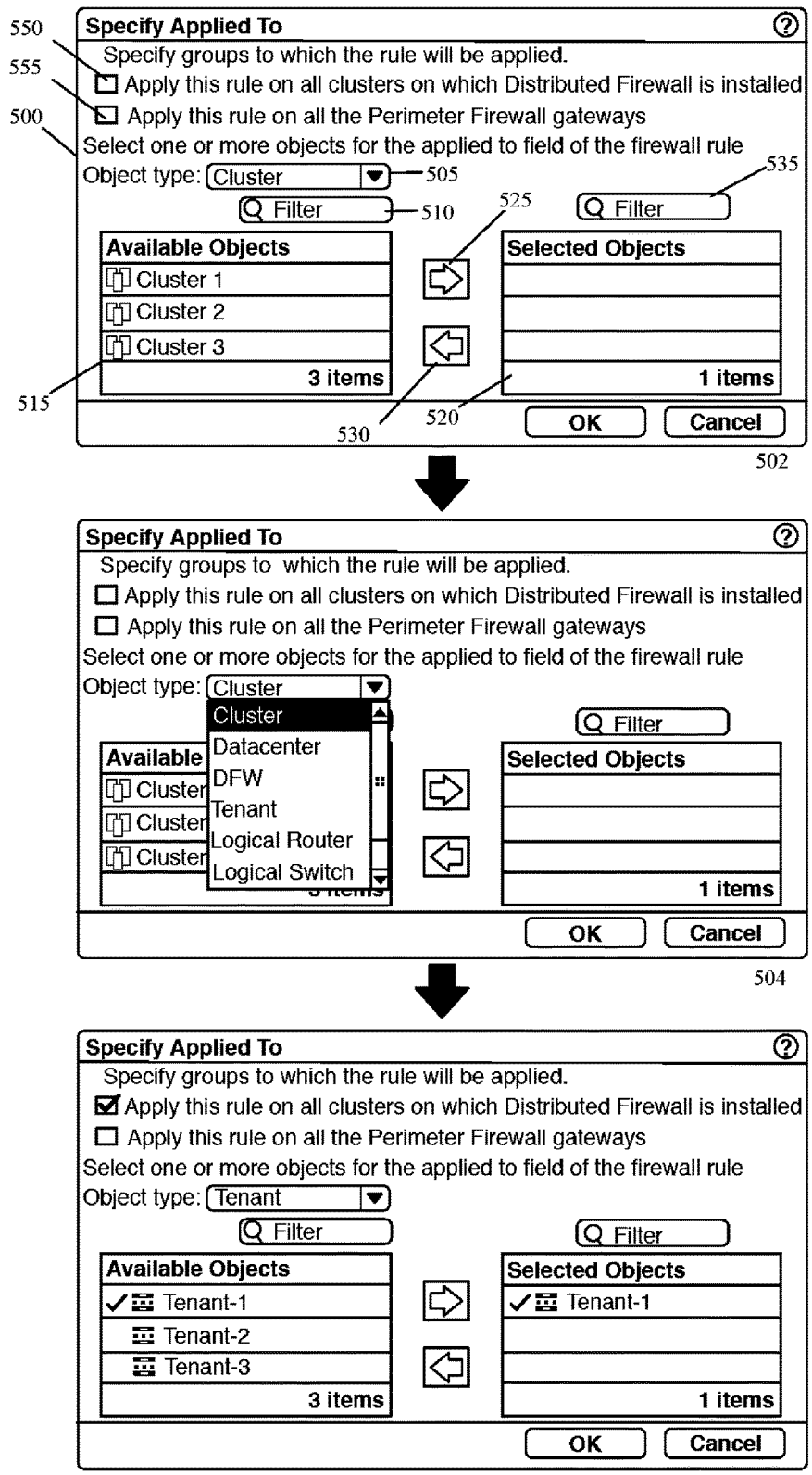
FIG. 5 illustrates a window that the console presents in some embodiments after the user selects (e.g., clicks) on the AppliedTo field of a firewall rule.

FIG. 5 illustrates a window 500 that the console 400 presents in some embodiments after the user selects (e.g., clicks on) the AppliedTo field of a firewall rule. This window has (1) one set of controls for searching for constructs in the datacenter and (2) another set of controls for selecting the searched constructs as enforcement points for the AppliedTo tuple (i.e., as enforcement points for the firewall rule). The first set of controls include drop-down control 505 for selecting a type of object in the datacenter, search window 515 for displaying the objects retrieved through the controls 505 and 510, and a filter field 510 for searching for one or more objects in the search window 515. The second set of controls includes a selection window 520 that lists objects added to the AppliedTo tuple, and selection and de-selection controls 525 and 530 that add objects to and remove objects from the selection window 520. Objects are added to this window 520 from the search window 515. The second set of controls also includes a filter field 535 for searching for one or more objects in the selection window 520.

FIG. 5 illustrates three operational stages 502, 504, and 506 of this window. The first stage 502 shows this window after it has opened. The drop-down control shows the selection of the cluster construct. Given this selection, the search window 515 shows a number of compute clusters in the datacenter.

The second stage 504 shows the window after the drop-down control 505 has opened to show various other constructs in the datacenter. In this example, these constructs include constructs such as cluster, datacenter, distributed firewalls, tenants, logical switches, logical routers, etc. The third stage 506 shows the window 500 after the tenant construct is selected through the drop-down control 505. Given this selection, the search window 515 shows a number of tenant identifiers. It also shows that Tenant 1 has been selected in the search window and added to the selection window 520.

As shown in FIG. 5, the AppliedTo window 500 also includes controls 550 and 555 to specify that the rule should be applied to all perimeter firewall devices and on all clusters that implement the distributed firewall. As mentioned above, a distributed firewall for a logical network is implemented by the port-level firewall engines on several hosts that execute the VMs of the logical network.

FIG. 6 illustrates the firewall management console after the deep packet firewall tab 416 has been selected. This figure shows two operational stages 602 and 604 of the console after the selection of the DP firewall tab 416. As shown by these stages, the rule section 420 displays the firewall rules that are associated with DP-inspection firewall appliances in the datacenter. Like the general and Ethernet based firewall rules, each DP-inspection firewall rule can be defined in terms of a rule number, rule name, source tuple, destination tuple, service tuple, action tuple, and AppliedTo tuple. Again, like the general and Ethernet based firewall rules, the source, destination, service, and AppliedTo tuples can be defined in terms of high- or low-level constructs in some embodiments.

Unlike general and Ethernet based firewall rules, the Action tuple of DP firewall rules in some embodiments can only specify a redirect operation. As shown in the second stage 604, the redirection tuple can specify re-directing a data message to a particular DP firewall appliance and a particular security service (antivirus, intrusion prevention system, intrusion detection system, firewall, etc.) that is performed by that appliance.

Figure 7:
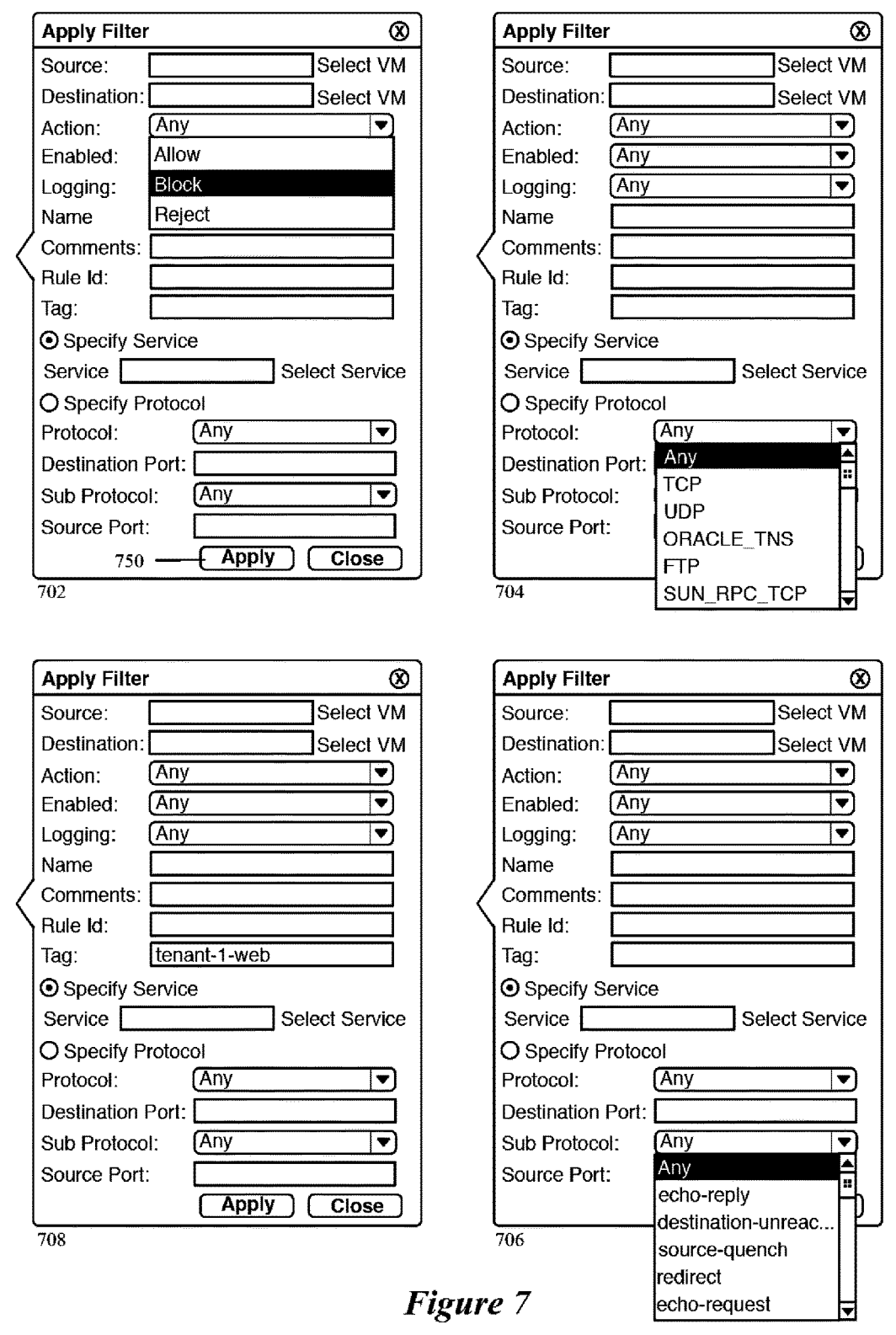

To view and debug firewall rules, a user can use the firewall rule filter controls of the management console 400. As mentioned above, this console provides two filtering controls. One filtering control is the search window 430. The other filtering control is the control 450 in the UI control section 418. Selection of this control 450 directs the management console 400 to present a filter window 700, which is illustrated in FIG. 7. This figure shows four different operational stages 702-708 of the filter window.

As shown in each of these stages 702-708, the filter window provides numerous controls for filtering the firewall rules along many dimensions. These dimensions includes the rules' specified (1) source and destination node identifiers (e.g., IP address, MAC address, name of the compute end nodes for the data messages), (2) action, (3) enabled/disabled status, (4) the logging status, (5) name, (6) associated comments, (7) identifier, (8) tagged metadata, (9) service, (10) protocol and sub-protocol, and (11) destination and source ports.

Just to give a few examples of how these dimensions can be used to specify filtering criteria, the stages 702-708 respectively show filtering criteria that are specified based on the firewall rules' (1) action tuple values, (2) protocol tuple values, (3) sub-protocol tuple values, and (4) tagged metadata values. Once the user specifies one or more filtering criteria, the user can apply the filtering criteria to the firewall rules that are currently being displayed in the firewall rule section 420 by selecting the apply control 750 in the filter window 700. For instance, if the user selects the apply control 750 after stage 408, the rule section would display all firewall rules that are specified for the webservers of Tenant 1.

Figure 8:
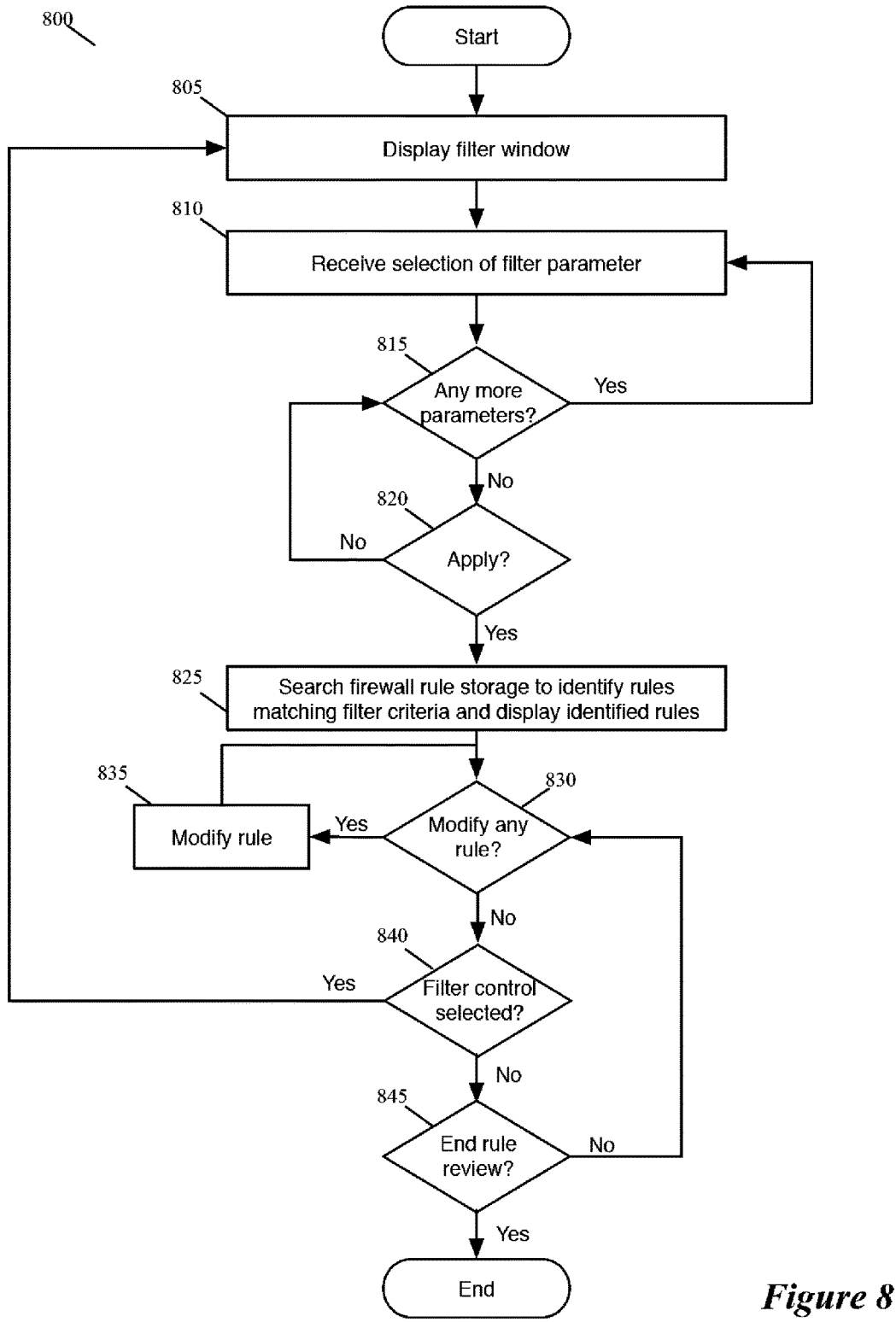
FIG. 8 presents one exemplary process that the firewall management console performs to allow a user to view, filter and debug rules.

FIG. 8 presents one exemplary process 800 that the firewall management console 400 performs to allow a user to view, filter and debug rules. The console can facilitate these operations because it serves as a single interface through which a user can define, view, modify and debug firewall rules in a datacenter, and because this console has access to the firewall rules that are defined for the datacenter. The process 800 starts when the user selects the filter control 450 while viewing one set of firewall rules in the rule section 420 of the firewall configuration pane.

In response, to this selection, the process 800 displays (at 805) the filter window 700. Next, at 810, the process receives a filter parameter set (i.e., one or more filter parameters) through one of the controls of the filter window 700. As mentioned above, this parameter set can relate to the following firewall rule attributes: (1) source and destination node identifiers (e.g., IP address, MAC address, name of the compute end nodes for the data messages), (2) action, (3) enabled/disabled status, (4) the logging status, (5) name, (6) associated comments, (7) identifier, (8) tagged metadata, (9) service, (10) protocol and sub-protocol, and (11) destination and source ports.

The process 800 then transitions to 815 to determine whether it has received additional parameter sets. If so, it returns to 810. Otherwise, it determines at 820 whether the apply control 750 has been selected to direct it to filter the firewall rules based on the received parameter set. If not, the process returns to 815.

When the process determines (at 820) that the apply control 750 has been selected, it accesses a firewall rule storage (e.g., a firewall rule storage maintained by the network controller set 120) to identify and display all firewall rules that meet the filter parameter set(s) that the console received at 810. In some embodiments, the firewall rule storage stores all the firewall rules that are defined for the datacenter through the firewall management console.

Next, at 830, the process determines whether it has received any modification to any rule. If so, the process would modify the rule (at 835) and return to 830. The process would receive rule modifications when after viewing the rules, the user would determine that a rule should be modified. This modification in some cases would be to resolve an incorrectly defined rule that is causing data messages to be dropped or delivered incorrectly. In other words, the user would modify a firewall rule (at 835) in order to debug the firewall rules.

When the process determines that it has not received modification to a rule, it determines (at 840) whether the filter control 450 has been selected again. If so, it returns to 805. If not, the process determines (at 845) whether the user has ended the rule review (e.g., by closing the firewall configuration pane). After 845, the process ends if the user has ended the rule review (e.g., closed the firewall configuration pane). Otherwise, the process returns to 830.

Figure 9:
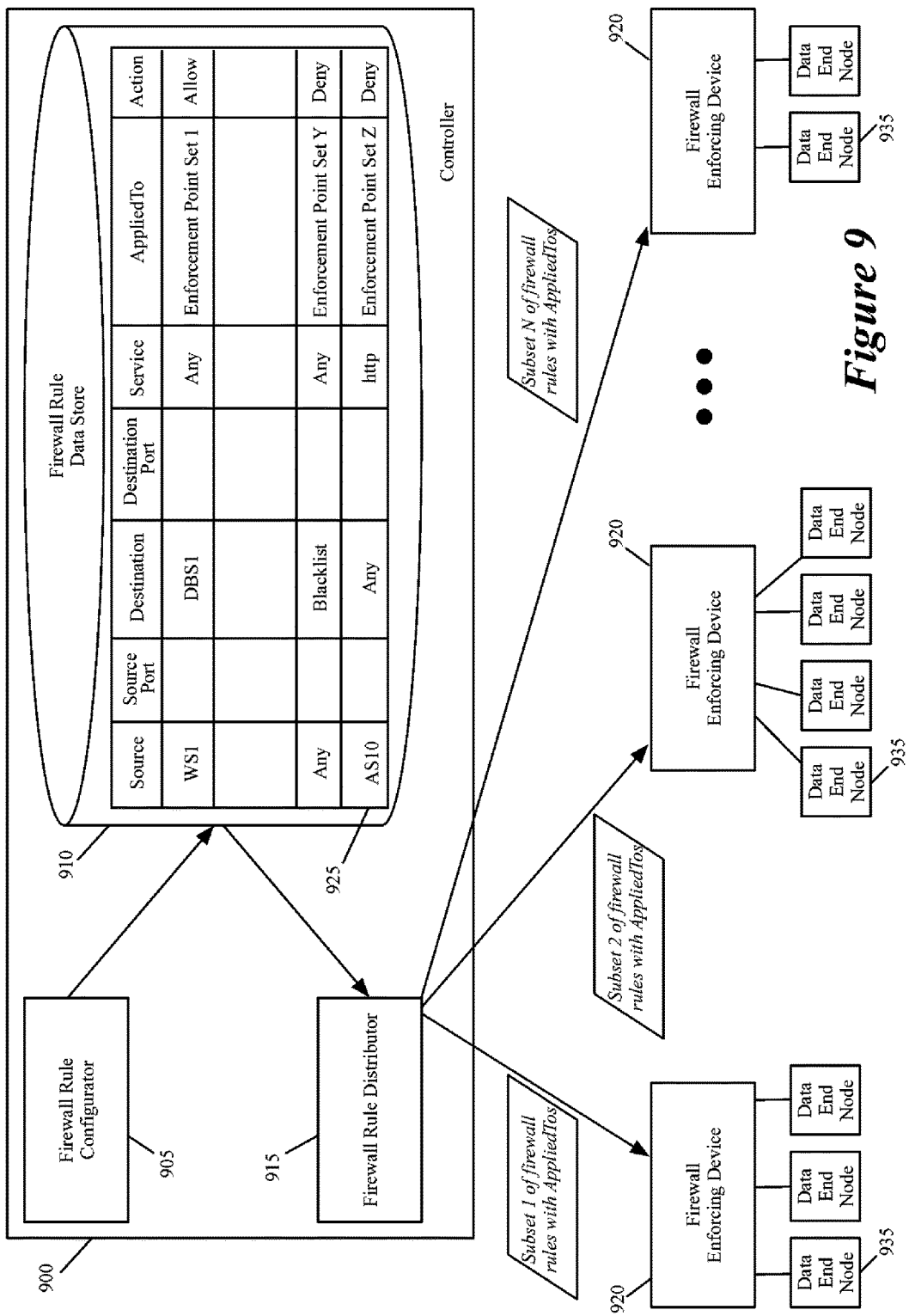
FIG. 9 illustrates a controller that configures and distributes firewall rules with AppliedTo identifiers.

FIG. 9 illustrates a controller 900 that processes AppliedTo firewall rules. In some embodiments, a datacenter has multiple of these controller operating independently or as part of a cluster. Also, in some embodiments, the controller 900 also serves as a network controller, e.g., provisions and configures forwarding elements. In other embodiments, the controller 900 only manages the firewalls in the datacenter.

The controller 900 provides the firewall management console in some embodiments. The controller 900 allows AppliedTo firewalls to be configured by users and/or automated processes. This controller also distributes the configured AppliedTo firewall rules to multiple firewall-enforcing devices 920 in a network (not shown) that includes multiple network nodes that are managed by the controller. As shown in FIG. 9, the controller includes a firewall rule configurator 905, a firewall data storage 910, and a firewall rule distributor 915. The firewall rule configurator 905 configures the AppliedTo firewall rules by interacting with users (through one or more user-interface (UI) modules) or with automated processes that are part of firewall provisioning and/or network configuration. This configurator 905 stores the configured AppliedTo rules in the firewall rule data storage 910.

As shown in FIG. 9, the rule configurator 905 specifies each firewall rule 925 in the data storage 910 in terms of n-data tuples for matching a packet with a firewall rule and an action to perform when a packet is matched to the rule. In this document, the term "packet" is to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc. Also, as used in this specification, layer 2 (L2), layer 3 (L3), layer 4 (L4), layer 5 (L5), layer 6 (L6), and layer 7 (L7) are references respectively to the second data link layer, the third network layer, the fourth transport layer, the fifth session layer, the sixth presentation layer and the seventh application layer of the OSI (Open System Interconnection) conceptual seven layer model.

In the example illustrated in FIG. 9, the n-data tuples are the six data tuples, Source, Source Port, Destination, Destination Port, Service (also called protocol), and AppliedTo identifiers. One or more of these identifiers may be specified by wildcard value that signifies the applicability of all possible values. As described above and further below, the AppliedTo identifier specifies the set of enforcement points at which the firewall rule has to be applied (i.e., enforced).

In some embodiments, the source and destination identifiers for L3 level firewall rules are specified in terms of IP addresses and/or L3 protocols, while they are specified in terms of MAC address and/or L2 protocols for L2 level firewall rules. In some embodiments, one or more of the source and destination identifier values can be logical values that are defined for a logical network (e.g., can be IP addresses defined in a logical address space). In other embodiments, all of the identifier values are defined in the physical domains. In still other embodiments, some of the identifier values are defined in logical domain, while other identifier values are defined in the physical domain. Logical networks and logical constructs will be further described below.

To ensure that packets match at least one firewall rule, the rule configurator 905 specifies at least one catchall firewall rule in the data storage 910 that ensures that each packet matches at least one rule when it does not match any other rule in the firewall table. Also, to address situations where a packet might match multiple rules, the rule configurator in some embodiments arranges the rules in the data storage 910 according to a precedence hierarchy that ensures that higher priority rules appear in the storage before lower priority rules. However, given that AppliedTo identifiers can be used to specify different enforcement nodes for different rules, the rule configurator (or a user that acts through the rule configurator) does not have to address precedence orders for firewall rules that are to be sent to different enforcement nodes.

In the example illustrated in FIG. 9, as well as other figures described below, the source and destination port values for the firewall rules are specified as wildcard values. One of ordinary skill will realize that this does not have to be the case for all firewall rules. AppliedTo firewall rules can be specified with respect to traditional port values, such as port 20, 80, 143, etc. Also, in the examples illustrated in the figures, the acronyms WS, AS, and DBS stand for webserver, application server, and database server. These servers can be specified by their associated network addresses (e.g., IP addresses). Also, the example firewall rules in these figures are meant to simply conceptually convey the notion of a firewall rule, as opposed to representing actual firewall rules of a system.

When a firewall engine (not shown) identifies a firewall rule that matches a packet, the engine performs on the packet the act that is specified by the rule's Action identifier. In some embodiments, the Action identifier specifies that the packet should be dropped or allowed to pass through. In other embodiments, other acts may be specified instead of or in conjunction with the drop and allow acts.

As mentioned above, the AppliedTo identifier specifies the set of enforcement points at which the firewall rule has to be applied. In some embodiments, the enforcement points can be defined in terms of identifiers for (1) VNICs, VMs, hosts or other compute constructs (e.g., compute clusters, datacenters, etc.), (2) network elements, such as physical forwarding elements (e.g., physical switches, physical routers, etc.), logical forwarding elements (e.g., logical switches, logical routers, etc.), other managed appliances, unmanaged third-party appliances (e.g., third party firewalls), and/or combination of such elements, and/or (3) security groups that are formed by a set of one or more VNICs, VMs, hosts, compute constructs and/or network constructs. By allowing AppliedTo identifiers to be specified in terms of both managed network devices and unmanaged network devices, the firewall configurator 905 provides a single unified interface to manage the entire firewall rule definition for the network that includes both managed and unmanaged devices.

In some embodiments, the AppliedTo tuple can also be set to a wildcard value, which signifies all possible values for the AppliedTo tuple (e.g., all VNICs). As further described below, the AppliedTo identifier in some embodiments can refer to dynamically modifiable constructs, which, in turn, allows the controller to dynamically adjust the firewall rules for different locations within a network by dynamically adjusting the membership of the dynamically modifiable constructs.

As shown in FIG. 9, the controller distributes the AppliedTo firewall rules to various firewall-enforcing devices 920 in the network. In some embodiments, the firewall-enforcing devices include hosts on which multiples VMs execute. In addition to, or instead of, such hosts, the firewall-enforcing devices in some embodiments include other types of firewall-enforcing devices, such as physical forwarding elements, service nodes (e.g., managed dedicated machines or managed VMs), edge appliances (e.g., top-of-rack switches), and third-party appliances.

In some embodiments, the controller distributes some of the AppliedTo firewall rules to some of the nodes with the AppliedTo tuples (that specify the sets of enforcement points associated with the firewall rules), while distributing other firewall rules to other nodes without the AppliedTo tuples. For instance, in some embodiments, the controller distributes the AppliedTo firewall rules to hosts with one or more executing VMs, while distributing non-AppliedTo firewall rules to one or more third party appliances that cannot process AppliedTo firewall rules. In other embodiments, however, the controller distributes AppliedTo firewall rules to some or all third party appliances as these appliances can process AppliedTo firewall rules. In still other embodiments, the controller distributed non-AppliedTo firewall rules (i.e., firewall rules without AppliedTo data tuples) to hosts with one or more executing VMs. In some of these embodiments, the controller uses the AppliedTo data tuples to identify the hosts or VMs to which it has to forward the firewall rules.

The firewall-enforcing devices 920 connect to one or more data end nodes 935, which can include different types of end nodes in different embodiments. Examples of such data end nodes include VMs and non-VM addressable nodes (e.g., volume mounters (iSCSI mounter, NFS mounter, etc.), VM migrators (e.g., vMotion module used in the ESX hypervisor of VMware Inc.), and hypervisor kernel network interface (e.g., vmknic of VMware Inc.)). For each data end node, or for a set of data end nodes, the firewall-enforcing devices 920 in some embodiments generate custom firewall data storages (e.g., firewall rule tables) based on the received AppliedTo firewall rules. To generate the custom firewall data storages, the firewall-enforcing devices use the AppliedTo identifiers of the received AppliedTo firewall rules to identify the firewall rule to store in the different custom firewall data storages.

For instance, in some embodiments, a multi-VM host that receives the AppliedTo firewall rules specifies multiple firewall rule tables for multiple VNICs of the VMs based on the AppliedTo identifiers of the firewall rules. The specified VNIC-level firewall rule tables in some embodiments no longer have the AppliedTo tuples. In some embodiments, the VNIC-level firewall rule table contains only the set of rules that are applicable to the VNIC's VM, and this set of rules is smaller than the overall number of rules that the host stores for all the VMs executing on it. Also, each rule in the VNIC-level firewall rule table is specified in terms of six tuples, which are the Source, Source Port, Destination, Destination Port, Service, and Action identifiers.

In some embodiments, the firewall-enforcing devices 920 connect directly to the data end nodes 935, or indirectly through one or more forwarding elements. Through their connections to the data end nodes, the firewall-enforcing devices 920 receive packets to and from the data end nodes. The enforcing devices 920 of some embodiments compare the attributes of the received packets with the firewall rules (e.g., with the five data tuples, Source, Source Port, Destination, Destination Port, and Service identifiers of the firewall rules) in the custom firewall data storages that the enforcing devices have created for the source or destination node of the packet. Based on this comparison, the enforcing devices identify a firewall rule corresponding to the packet, and then perform the action specified by the identified firewall rule.

Figure 10:
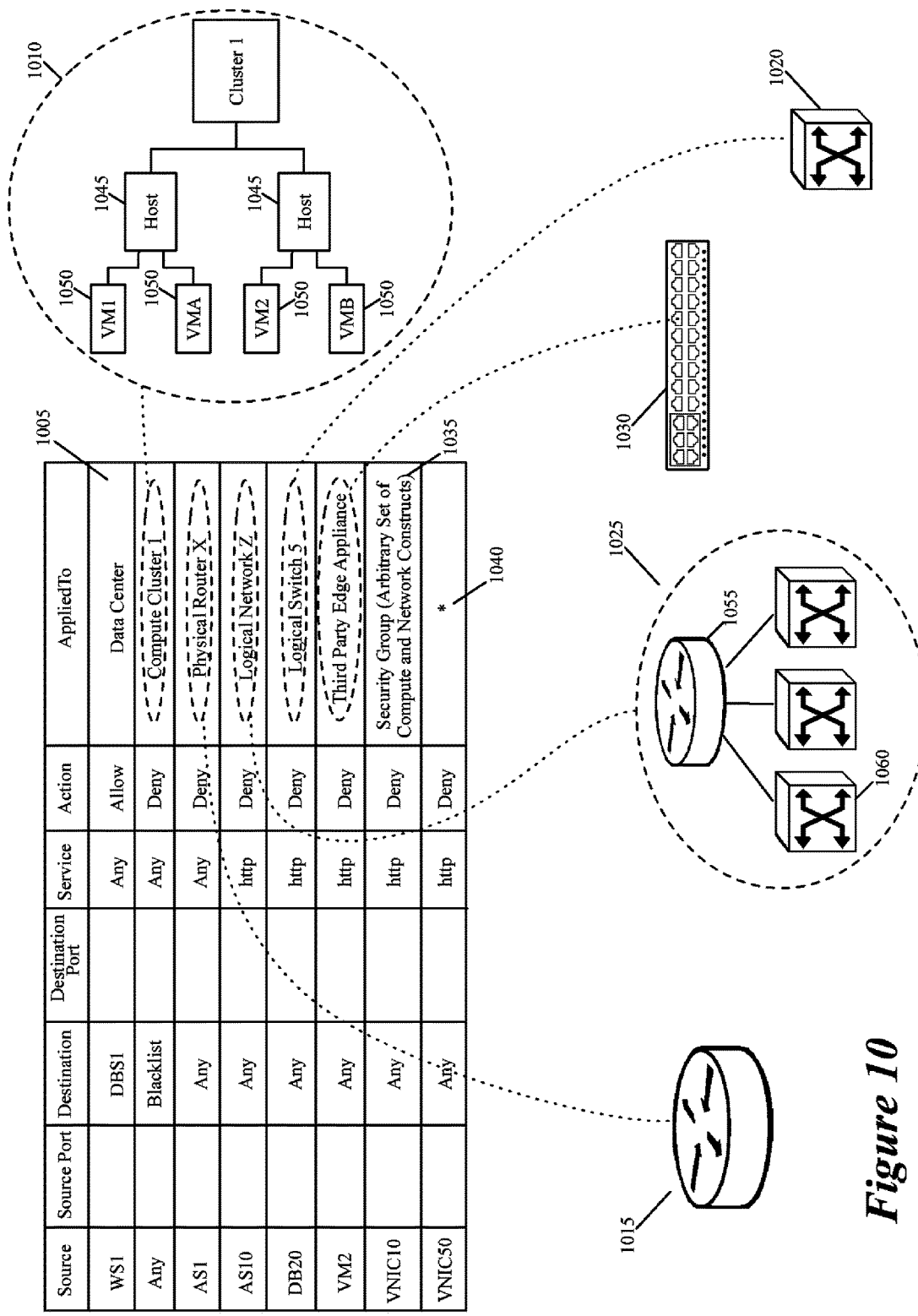
FIG. 10 illustrates several examples of enforcement points that are used to specify the AppliedTo tuples in some embodiments.

FIG. 10 illustrates several examples of enforcement points that are used to specify the AppliedTo tuples in some embodiments. Specifically, this figure illustrates several examples of AppliedTo firewall rules 925 that are configured and stored by the controller 900 of some embodiments. As before, each of these rules includes the traditional five tuples, Source, Source Port, Destination, Destination Port, and Service, in addition to the AppliedTo tuple and the Action value.

The examples of the AppliedTo tuples that are shown in FIG. 10 include (1) compute constructs, such as data center 1005 and compute cluster 1010, (2) network constructs, such as physical router 1015, logical switch 1020, and logical network 1025, (3) third-party network appliance 1030, (4) a security group 1035, and (5) a wildcard entry 1040.

In some embodiments, a datacenter is a location that houses multiple hosts, each of which might be dedicated to one tenant or multiple tenants. Each host might be dedicated non-virtualized machine, or it might be a virtualized machine on which multiple VMs execute. A compute cluster is a group of hosts in a datacenter. FIG. 10 illustrates an example of a compute cluster that is formed by two hosts 1045 that each executes two VMs 1050. In some embodiments, each host in a compute cluster is configured to support a set of tenants, so that when a VM is instantiated on or moved to one such host, some or all of the data needed for configuring that VM and configuring the VNIC-level firewall data storage on the host already exists on the host.

In some embodiments, each physical forwarding element (PFE) is a forwarding element that exists in the physical world. FIG. 10 illustrates the physical router 1015 as an example of a PFE. Examples of such a PFE include a switch, a router, a firewall appliance, a load balancer, etc. In some embodiments, all such physical devices (switches, routers, firewall appliances, load balancers, etc.) can be standalone hardware devices, hardware devices that are implemented by the physical NICs of the hosts, or software devices that execute on shared or dedicated hosts.

In this document, software-forwarding elements are referred to as physical forwarding elements (PFEs), in order to distinguish them from logical forwarding elements, which are logical constructs that are not tied to the physical world. In other words, the software forwarding elements are referred to as PFEs because they exist and operate in the physical world, whereas logical forwarding elements are simply a logical representation of a forwarding element that is presented to a user or a program in some embodiments.

In some embodiments, software forwarding elements executing on different host devices (e.g., different computers) are configured to implement different logical forwarding elements (LFEs) for different logical networks of different tenants, users, departments, etc. that use the same shared compute and networking resources. For instance, two software forwarding elements executing on two host devices can perform L2 switching functionality. Each of these software switches can in part implement two different logical L2 switches, with each logical L2 switch connecting the VMs of one entity. In some embodiments, the software forwarding elements provide L3 routing functionality, and can be configured to implement different logical routers with the software L3 routers executing on other hosts. FIG. 10 illustrates a logical switch 1020 as an example of a logical forwarding element.

A logical network is a network that is formed by one or more logical forwarding elements. FIG. 10 illustrates an example of a logical network 1025 that is formed by one logical router 1055 and three logical switches 1060. Like logical forwarding elements, logical networks are a logical representation of a network that is presented to a user or a program in some embodiments. Although not shown in the example illustrated in FIG. 10, the AppliedTo tuple can also specify a physical network (that is formed by one or more PFEs) as an enforcement point for a firewall rule.

In a network that includes multiple physical forwarding elements that are managed by one or more controllers (e.g., managed by the controllers to implement one or more LFEs), third-party appliances are forwarding elements that are not managed or are minimally managed by the controller(s). For instance, in multi-tenant hosted environment of some embodiments, multiple controllers manage multiple physical forwarding elements that operate at the edge of the network (i.e., manage PFEs that execute on the hosts or directly connect to the hosts). The connection between the PFEs on the edge, however, traverses through internal network fabric that includes third-party appliances (such as third-party top-of-rack switches). In some managed networks of some embodiments, the managed forwarding elements include both managed edge forwarding elements and managed non-edge forwarding elements. In some of these embodiments, the managed non-edge forwarding elements perform functions that are not readily handled by the managed edge forwarding elements in those embodiments. These non-edge forwarding elements are referred to as service nodes in some embodiments.

In some embodiments, AppliedTo tuples can specify the enforcement points in terms of security groups that are formed by grouping one or more VNICs, VMs, hosts, compute constructs and/or network constructs. For instance, an AppliedTo firewall rule can be limited (by the AppliedTo tuple) to a security group that is specified in terms of a particular compute cluster and a particular logical network that connects a particular tenant's VMs that execute on the cluster's hosts. Security groups can be specified by users (e.g., network administrators) in some embodiments. Conjunctively, or alternatively, security groups can be specified by automated process in some embodiments. As shown by entry 1040, a wildcard value can also specify an AppliedTo tuple. The wildcard value in some embodiments signifies all possible values for the AppliedTo tuple (e.g., all VNICs).

The AppliedTo identifier in some embodiments can refer to dynamically modifiable constructs, which, in turn, allows the controller to dynamically adjust the firewall rules for different locations within a network by dynamically adjusting the membership of the dynamically modifiable constructs. In some embodiments, one or more of the compute constructs, network constructs and security groups can be specified as dynamic grouping construct that can have members (e.g., forwarding elements, hosts, VNICs, etc.) dynamically added and/or removed from them. When a dynamic grouping construct that is used to define the AppliedTo tuple(s) of one or more firewall rules is modified, the controller of some embodiments does not resend the firewall rule to the affected network nodes, but instead only sends the updated membership change to the group that is defined by the dynamic grouping construct.

Figure 11:
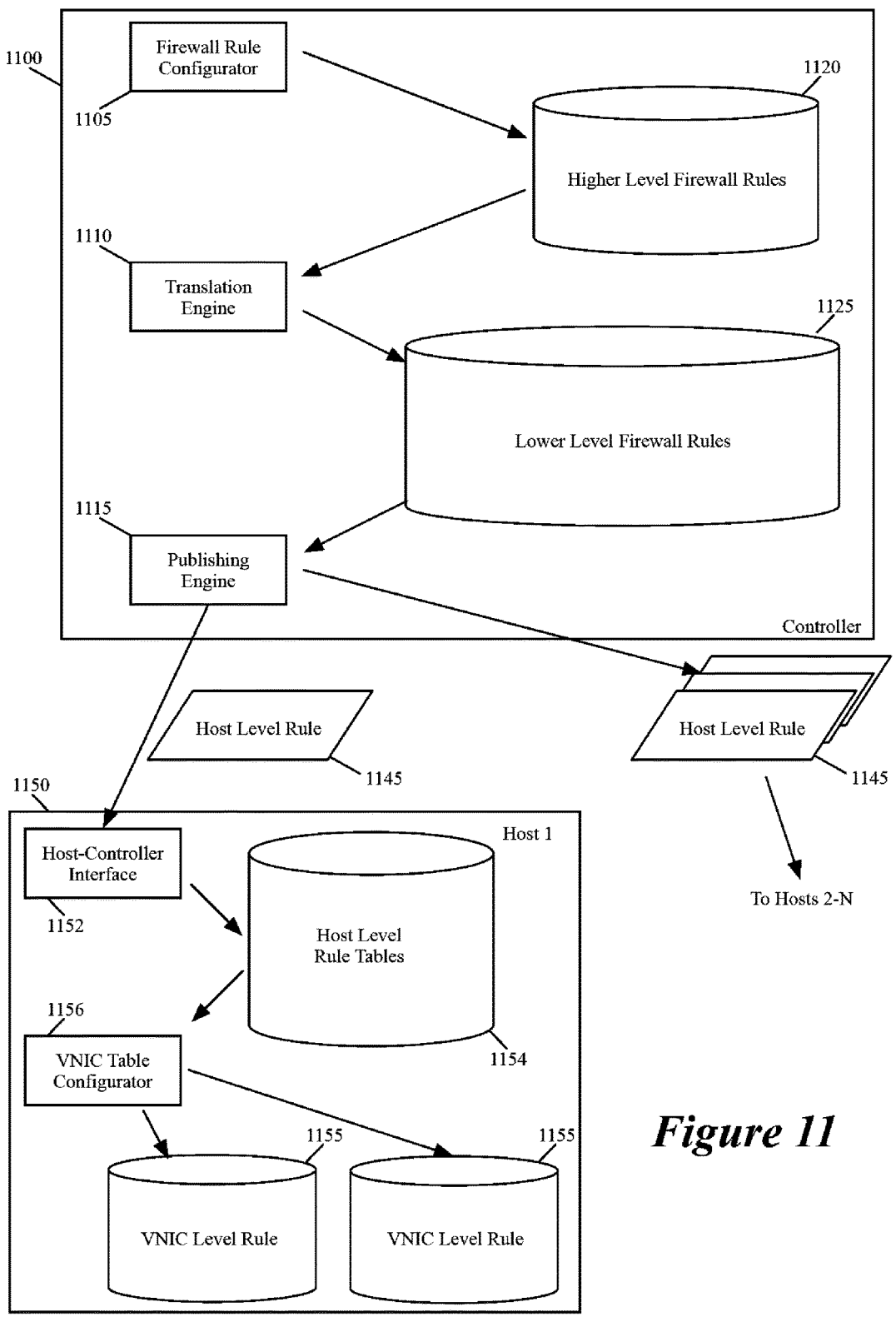
FIG. 11 illustrates another controller that specifies and distributes AppliedTo firewall rules.

The controller of some embodiments allows the AppliedTo firewall rules (1) to be specified (e.g., by a network administrator or by an automated firewall configurator) in terms of higher-level enforcement point identifiers, but then (2) to be distributed in terms of lower-level enforcement point identifiers that are decipherable or easier to decipher by the firewall-enforcing devices. FIG. 11 illustrates one such controller 1100, as well as one host 1150 that receives firewall rules that are distributed by the controller 1100. Like the controller 900, the controller 1100 can be part of cluster or work independently. Also, it can be a network controller that manages networking elements (including firewall devices) in the datacenter, or it can just manage firewall elements. In addition, like the controller 900, the controller 1100 provides the firewall management console in some embodiments.

As shown in this figure, the controller 1100 includes a firewall rule configurator 1105, a translation engine 1110, a publishing engine 1115, a high-level rule data storage 1120, and a low-level rule data storage 1125. The example illustrated in FIG. 11 will be described by reference to FIG. 12, which illustrates several firewall rule tables that are created by the controller 1100 and the host 1150 in some embodiments of the invention.

Like the firewall rule configurator 905, the firewall rule configurator 1105 configures the AppliedTo firewall rules by interacting with users (through one or more user-interface (UI) modules) and/or automated processes. The firewall rule configurator 1105 allows users or automated processes to specify AppliedTo firewall rules in terms of high-level enforcement point identifiers. Examples of such high-level enforcement point identifiers are the high-level network, compute, and security constructs, such as logical switches, logical routers, logical networks, physical networks, compute clusters, datacenters, etc.

The configurator 1105 stores the AppliedTo firewall rules that it configures in the rule data storage 1120. FIG. 12 illustrates an example of a high-level firewall rule table 1205 that the controller configures and stores in the high-level data storage 1120 of some embodiments. As shown, the high-level firewall rule table 1205 stores multiple AppliedTo firewall rules that have AppliedTo identifiers defined in terms of high-level constructs, such as a compute cluster, a datacenter, and a logical switch.

From the rule data storage 1120, the translation engine 1110 retrieves the AppliedTo firewall rules, and converts the high-level enforcement point identifier in the AppliedTo tuples of the retrieved rules to lower-level enforcement point identifiers. For instance, in some embodiments, the translation engine converts compute constructs (e.g., datacenter identifiers, compute cluster identifiers, host identifiers, etc.) and network constructs (e.g., LFE identifiers, logical network identifiers, etc.) into VNIC values (VNIC identifiers) and wildcard values. FIG. 12 illustrates an example of a low-level firewall rule table 1210. As shown, this table 1210 contains the same firewall rules as the high-level firewall rule table 1205 but each rule's AppliedTo identifier now specifies either a wildcard value 1212 or a set of VNICs associated with the high-level identifiers.

In so converting the enforcement point identifiers, the translation engine 1110 ensures that all AppliedTo firewall rules are defined by low-level enforcement point identifiers that can be deciphered by all firewall-enforcing devices that receive the AppliedTo firewall rules. The translation engine stores the AppliedTo firewall rules that it retrieves, and when necessary converts, in the rule data storage 1125.

In some embodiments, the translation engine 1110 translates other parameters of the firewall rules from the data storage 1120 before storing the translated rules in the data storage 1125. For instance, in some embodiments, the source and destination identifiers of the firewall rules might be specified in terms of high-level constructs (e.g., grouping constructs such as web server, app server, database server, etc.) that have to be converted to lower-level identifiers (e.g., specific IP addresses) before distributing the firewall rules to the firewall-enforcing devices.

One of ordinary skill will realize that the translation engine operates differently in other embodiments. For instance, in some embodiments, the translation engine does not translate, or does not always translate, high-level source and destination identifiers to low-level source and destination identifiers. In some of these embodiments, the translation engine leaves this translation to some or all of the firewall-enforcing devices to do. Similarly, in some embodiments, the translation engine does not translate, or does not always translate, high-level AppliedTo identifiers to low-level AppliedTo identifiers for some or all of the firewall-enforcing devices, because the translation engine leaves this translation to some or all of the firewall-enforcing devices to do. Foregoing some or all of translation of the high-level firewall identifiers (e.g., AppliedTo, source and destination identifiers), simplifies the size and/or number of firewall rules that the controller distributes to the enforcing devices, but comes at the expense of requiring the enforcing devices to have the capability (e.g., the network state information) to perform this translation.

Even in some embodiments that have the controller distribute firewall rules with low-level AppliedTo identifiers (e.g., with only VNIC and wildcard values), the controller may not use a translation engine 1110 that unpacks (i.e., converts) the high-level AppliedTo identifiers (e.g., the high-level network, compute, and/or security constructs) into low-level AppliedTo identifiers. For instance, each high-level AppliedTo identifier (e.g., each compute cluster identifier, LFE identifier, etc.) is specified as an object with a reference to a list of VNIC values. In some of these embodiments, the translation engine's job is to populate the VNIC list of the high-level identifier object with the identities or references to wildcard values or the VNICs that are members of the high-level AppliedTo identifier (e.g., are members of the compute cluster, the LFE, etc.). In some embodiments, the rule configurator 1105 so populates the VNIC list, and hence in these embodiments, a translation engine is not used for any processing associated with the high-level AppliedTo identifiers.

For each data end node that should receive AppliedTo firewall rules, the publishing engine 1115 (1) collects host-level AppliedTo rules 1145 from the low-level data storage 1125, and (2) distributes the collected firewall rules to the data end node. FIG. 11 shows the publishing engine distributing firewall rules to multi-VM hosts. However, one of ordinary skill will realize that the publishing engine 1115 is used to distribute firewall rules to other firewall-enforcing devices in other embodiments.

For each host, the publishing engine 1115 identifies and retrieves from the lower-level data storage 1125, the AppliedTo rules that pertain to the host. In some embodiments, the publishing engine only sends to each host the AppliedTo rules that pertain to the host. These AppliedTo rules in some embodiments include the AppliedTo rules that relate to VMs that are executing on the host. FIG. 12 illustrates an example of a host-level firewall rule table 1215 that the publishing engine distributes to a host in some embodiments. This table only includes the AppliedTo firewall rules that are applicable to the recipient host. As such, this table is typically much smaller than the high-level and low-level AppliedTo tables 1205 and 1210, because this table 1215 contains AppliedTo rules that pertain to one host.

In some embodiments, the rules that pertain to each host also include the AppliedTo rules that relate to VMs that may be instantiated on the host. For instance, when a particular host belongs to a compute cluster that implements a particular logical network, the publishing engine 1115 of some embodiments pushes the AppliedTo rules for the logical network to the particular host even before a VM that belongs to the logical network is instantiated on the particular host. Pushing the AppliedTo firewall rules ahead of time to such a host is advantageous because it allows the host to configure the firewall rules for the VM without interacting with a controller. Such configuration of the firewall rules is referred to below as headless provisioning of the firewall rules as it does not require interaction with a controller.

In some embodiments, the publishing engine 1115 collects the AppliedTo rules 1145 for each host by examining the higher-level AppliedTo data storage 1120. For instance, some embodiments do not define a lower-level AppliedTo data storage 1125. In these embodiments, the publishing engine 1115 sifts through the higher-level AppliedTo data storage 1120 to identify AppliedTo firewall rules that are applicable to a host.

Also, even though FIGS. 11 and 12 illustrate the creation and distribution of host-level AppliedTo rule sets to different hosts, one of ordinary skill will realize that in other embodiments the publishing engine 1115 examines the controllers AppliedTo data storage(s) to identify and publish firewall rule sets to non-host firewall-enforcing devices (such as third-party firewall devices). The publishing engine (1) only publishes non-AppliedTo firewall rules (i.e., rules without the AppliedTo identifier) to the non-host firewall-enforcing devices in some embodiments, (2) only publishes AppliedTo firewall rules (i.e., rules with AppliedTo identifiers) to the non-host firewall-enforcing devices in other embodiments, and (3) publishes non-AppliedTo firewall rules to some non-host firewall-enforcing devices while publishing AppliedTo firewall rules to other non-host firewall-enforcing devices.

Each host has a host-controller interface 1152 that receives and stores the host-level rules in a host-level rules table 1154. Each host also has a VM firewall configurator that from the host-level rules that are stored in the host-level rules tables 1154 identifies and stores a subset of firewall rules for each VM that is executing on the host. In the embodiments illustrated in FIG. 11, the VM firewall configurator is a VNIC-table configurator 1156 that generates one VNIC-level firewall rule set for each VNIC of each VM, by (1) using the AppliedTo data tuples in the host-level rules 1154 to identify the firewall rules that are applicable to the VNIC, (2) retrieving the identified rules from the host-level rules, and (3) storing the retrieved rules in the VNIC-level firewall data storage 1155 for the VNIC. In some embodiments, each VM has one VNIC. However, in other embodiments, some or all VMs can have more than one VNIC.

FIG. 12 illustrates an example of a VNIC-level firewall rule table 1220. As shown in this table, the firewall rules in the VNIC-level firewall rule table do not include the AppliedTo tuple, and are each specified only in terms of five tuples (Source, Source Port, Destination, Destination Port, and Service identifiers) and the action value. As the VNIC-level firewall rule table contains only the set of rules that are applicable to a particular VNIC, this set of rules is smaller than the overall number of rules that the host stores for all the VMs executing on it. This smaller size allows for faster processing of the firewall rules by a firewall rule engine (not shown) of a host.

The above-described firewall rule distribution methodologies have several advantages. By using AppliedTos to specify the enforcement point sets for the firewall rules, and applying rule filtering at multiple levels during management-plane provisioning and dataplane deployment, these methodologies allow concise, non-bloated firewall rule tables to be easily specified for data end nodes (e.g., VMs, VNICs, etc.). Also, the non-bloated firewall rule tables result in faster processing by the firewall rule engine and hence better performance.

Figure 13:
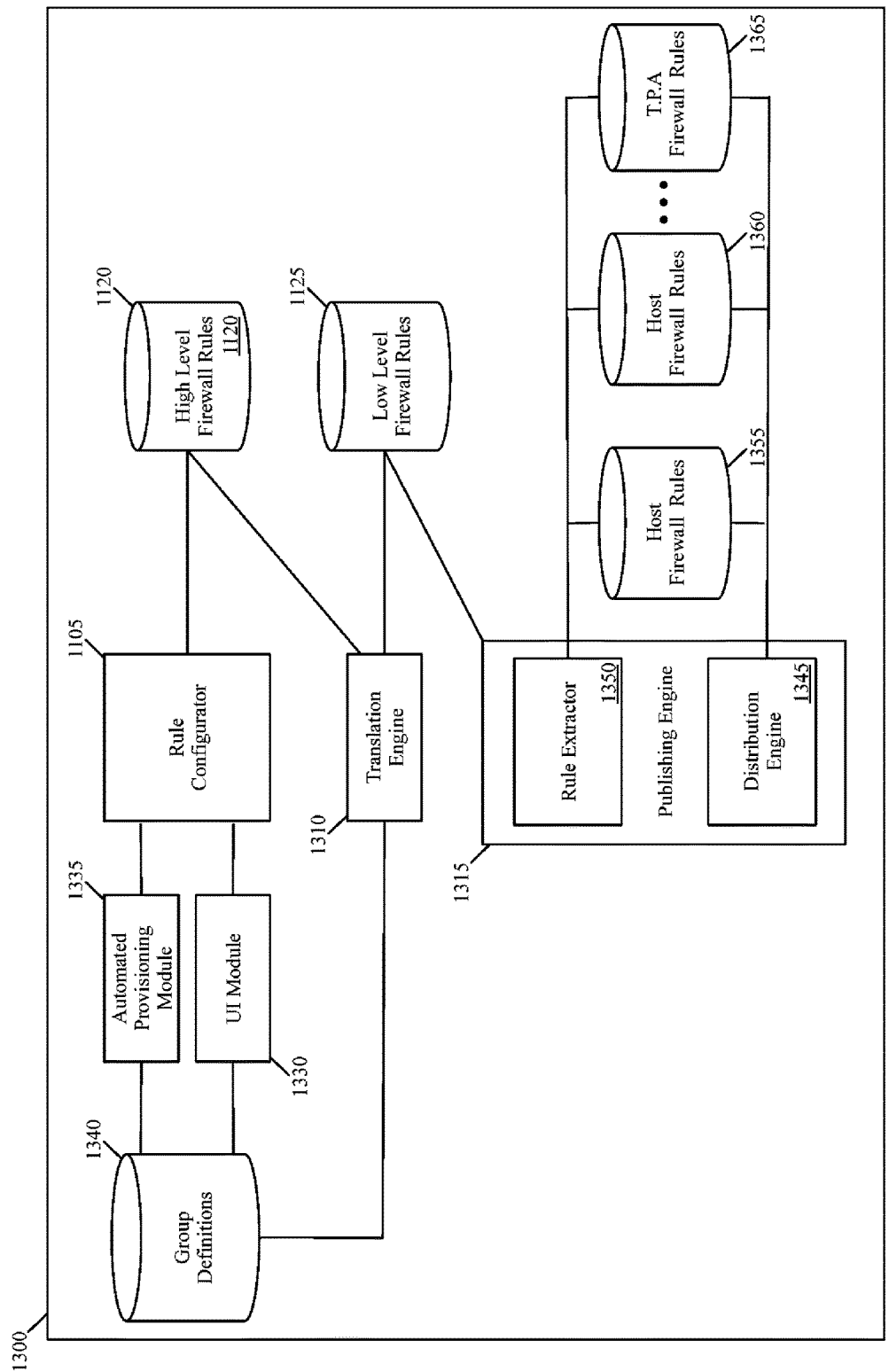
FIG. 13 illustrates another controller that specifies and distributes AppliedTo firewall rules.

FIG. 13 illustrates a controller 1300 of some embodiments of the invention. Like controller 1100 of FIG. 11, the controller 1300 can configure AppliedTo firewall rules in terms of higher-level enforcement point identifiers, but distributes the AppliedTo firewall rule in terms of lower-level enforcement point identifiers. Also, like the controller 1100, the controller includes a rule configurator 1105, a translation engine 1310, a publishing engine 1315, a high-level data storage 1120, and a low-level data storage 1125. In addition to these components, FIG. 13 illustrates the controller 1300 to include a user interface (UI) module 1330, an automated provisioning module 1335, a group-definition data storage 1340, and several enforcing-device data storages 1355, 1360 and 1365.

The firewall rule configurator 1305 configures the AppliedTo firewall rules by interacting with users (e.g., network administrators) through the UI module 1330. It also configures the AppliedTo firewall rules at the direction of automated provisioning module 1335 that directs the configurator to specify these rules as part of the provisioning of a physical or logical network. For instance, when the controller 1300 is part of a network control system that manages logical networks in a multi-user (e.g., multi-tenant) hosted environment, the provisioning module 1335 in some embodiments directs the configurator 1305 to specify at least some of the AppliedTo firewall rules when a logical network is being specified for one user (e.g., for one tenant).

The configurator 1305 allows users (through the UI module 1330) or the provisioning module 1335 to specify AppliedTo firewall rules in terms of high-level enforcement point identifiers. Examples of such high-level enforcement point identifiers are the high-level network, compute, and security constructs, such as logical switches, logical routers, logical networks, physical networks, compute clusters, datacenters, etc. The configurator 1305 stores the AppliedTo firewall rules that it configures in the rule data storage 1120.

From the rule data storage 1120, the translation engine 1310 retrieves the AppliedTo firewall rules, and converts the high-level enforcement point identifiers in the AppliedTo tuples of the retrieved rules to lower-level enforcement point identifiers. For instance, in some embodiments, the translation engine converts compute constructs (e.g., datacenter identifiers, compute cluster identifiers, host identifiers, etc.), network constructs (e.g., LFE identifiers, logical network identifiers, etc.), and security groups (formed by one or more network or compute constructs) into VNIC and wildcard values. In so converting the enforcement point identifiers, the translation engine 1310 ensures that all AppliedTo firewall rules are defined by low-level enforcement point identifiers that can be deciphered by all firewall-enforcing devices that receive the AppliedTo firewall rules. The translation engine stores the AppliedTo firewall rules that it retrieves, and when necessary converts, in the low level rule data storage 1125.

To convert high-level enforcement point identifiers (e.g., the high-level network construct, compute construct, and security groups) to low-level enforcement point identifiers (e.g., to VNIC and wildcard values), the translation engine relies on the definition of the high-level groups that are stored in the group definition data storage 1340. These definitions are stored by a user (through the UI module 1330) or by the automated provisioning module 1335.

In some embodiments, these definitions are statically defined. In other embodiments, some or all of the high-level group definitions are dynamically modifiable by a user or the provisioning module 1335. Specifically, the AppliedTo identifier in some embodiments can refer to dynamically modifiable constructs, which, in turn, allows the controller 1300 to dynamically adjust the firewall rules for different locations within a network by dynamically adjusting the membership of the dynamically modifiable constructs. In some embodiments, the rule configurator 1105 can specify one or more of the compute constructs, network constructs and security groups as dynamic grouping constructs that can have members (e.g., forwarding elements, hosts, VNICs, etc.) dynamically added and/or removed from them.

For enforcement points that are defined by reference to static or dynamic groups, the translation engine 1310 (1) uses the group definitions in the data storage 1340 to identify the low-level identifiers (e.g., the VNIC and wildcard values) associated with the high-level identifiers, (2) substitutes the high-level identifiers with the identified low-level identifiers, and (3) stores the resulting rules in the data storage 1125. When a dynamic grouping construct that is used to define the AppliedTo tuple(s) of one or more firewall rules is modified, the translation engine updates the low-level enforcement point identifiers of the affected firewall rules. As further described below, the publishing engine 1315 then sends the updated membership change for the affected firewall rules to the firewall-enforcing devices that need to be informed of this membership change. This approach foregoes the need to resend the affected firewall rules to the firewall-enforcing devices that previously received these rule. However, the publishing engine will send an affected firewall rule to a new firewall-enforcing device when the membership change to a dynamic grouping construct requires the addition of a new firewall-enforcing device.

Like the translation engine 1110 of the controller 1100, the translation engine 1310 of controller 1300 translates other parameters (e.g., source and destination identifiers) of the firewall rules from the data storage 1320 before storing the translated rules in the data storage 1325. Also, like the translation engine of the controller 1100, the translation engine 1310 of the controller 1300 operates differently in other embodiments. For instance, in some embodiments, the translation engine leaves some or all of the translation of the high-level constructs of the firewall rules of the data storage 1120 to some or all of the firewall-enforcing devices to do.

Also, even in some embodiments that have the controller 1300 distribute firewall rules with low-level AppliedTo identifiers (e.g., with only VNIC and wildcard values), the controller 1300 does not use the translation engine 1310 to unpack (i.e., to convert) the high-level AppliedTo identifiers (e.g., the high-level network, compute, and/or security constructs) into low-level AppliedTo identifiers. For instance, in some embodiments that specify each high-level AppliedTo identifier (e.g., each compute cluster identifier, LFE identifier, etc.) as an object with a reference to a list of VNIC values, the translation engine's job is to populate the VNIC list of the high-level identifier object with the identities or references to wildcard values or the VNICs that are members of the high-level AppliedTo identifier (e.g., are members of the compute cluster, the LFE, etc.). In some embodiments, the rule configurator 1105 so populates the VNIC list (e.g., by reference to the group definitions in the data storage 1340), and hence in these embodiments, a translation engine is not be needed for any processing associated with the high-level AppliedTo identifiers.

The publishing engine 1315 collects and distributes enforcing-device AppliedTo rules from the low-level data storage 1125. As shown in FIG. 13, the publishing engine 1315 includes a rule extractor 1350 and a distribution engine 1355. For each firewall-enforcing device, the rule extractor 1350 identifies and retrieves from the lower-level data storage 1325, the AppliedTo rules that pertain to the enforcing device. The rule extractor 1350 stores the retrieved firewall rules for each particular firewall-enforcing device in a data storage (e.g., data storages 1355, 1360, and 1365) that the publishing engine maintains for the particular firewall-enforcing device.

In some embodiments, the rule extractor 1350 only retrieves and stores for each firewall-enforcing device the AppliedTo rules that pertain to that firewall-enforcing device. As such, the enforcing-device data storages (e.g., data storages 1355, 1360, and 1365 that store the firewall rules for each firewall-enforcing device) are typically much smaller than the high-level and low-level data storages 1120 and 1125, because the enforcing-device data storages contain only AppliedTo rules that pertain to their respective enforcing device.

In some embodiments, the AppliedTo firewall rules that pertain to a firewall-enforcing device include the AppliedTo rules that relate to data end nodes (e.g., the VMs or the VM VNICs) that are connected to the firewall-enforcing device. In some embodiments, the rules that pertain to each firewall-enforcing device also include the AppliedTo rules that relate to data end nodes that may be connected to the firewall-enforcing device. For instance, when a particular host belongs to a compute cluster that implements a particular logical network, the rule extractor 1350 of some embodiments stores, in a data storage for the particular host, the AppliedTo rules that are specified for the logical network even before a VM that belongs to the logical network is instantiated on the particular host. Pushing the AppliedTo firewall rules ahead of time to such a host is advantageous because it allows the host to configure the firewall rules for the VM without interacting with a controller.

In some embodiments, the rule extractor 1350 collects the AppliedTo rules 1345 for each enforcing device by examining the higher-level AppliedTo data storage 1320. For instance, some embodiments do not define a lower-level AppliedTo data storage 1325. In these embodiments, the rule extractor 1350 sifts through the higher-level AppliedTo data storage 1320 to identify AppliedTo firewall rules that are applicable to a firewall-enforcing device.

FIG. 13 shows three of the data storages 1355, 1360, and 1365 that the rule extractor 1350 maintains. Two of these data storages 1355 and 1360 are for hosts that execute firewall engines that serve as firewall-enforcing devices for the VMs executing on the hosts. The third data storage 1365 is for a third party firewall appliance. The publishing engine (1) only publishes non-AppliedTo firewall rules (i.e., rules without the AppliedTo identifier) to the non-host firewall-enforcing devices in some embodiments, (2) only publishes AppliedTo firewall rules to the non-host firewall-enforcing devices in other embodiments, and (3) publishes non-AppliedTo firewall rules to some non-host firewall-enforcing devices while publishing AppliedTo firewall rules to other non-host firewall-enforcing devices.

Accordingly, in some embodiments, the rule extractor removes the AppliedTo identifiers for all firewall rules that are to be published to non-host firewall-enforcing devices, before storing the firewall rules in the data storages (e.g., data storage 1365) that it maintains for these devices. In other embodiments, the rule extractor stores the firewall rules with their AppliedTo identifiers in the data storages (e.g., data storage 1365) that it maintains for the non-host firewall-enforcing devices. In still other embodiments, the rule extractor stores the firewall rules without their AppliedTo identifiers for some non-host firewall-enforcing devices while storing the firewall rules with their AppliedTo identifiers for other non-host firewall-enforcing devices.

In some embodiments, the distribution engine 1345 of the publishing engine 1315 pushes to each firewall-enforcing device (through a network) the firewall rules that are stored in the data storage that the rule extractor maintains for the firewall-enforcing device. In other embodiments, the firewall-enforcing devices pull the firewall rules from the distribution engine. In still other embodiments, the distribution engine pushes the firewall rules to some of the firewall-enforcing devices, while serving as a resource to pull firewall rules for other firewall-enforcing devices.

As mentioned above, the publishing engine distributes to the firewall-enforcing devices updates to AppliedTo enforcement point sets when a user or an automated process dynamically modifies such sets. Such modifications cause the translation engine in some embodiments to update the firewall rules in the lower-level data storage 1125. This, in turn, can cause the rule extractor to update the AppliedTo fields in one or more rules in one or more enforcing-device data storages that it maintains for the firewall-enforcing devices. Updates to the firewall rules in the lower-level data storage can also cause the rule extractor to create a new firewall rule for a newly specified enforcement point (i.e., a firewall-enforcing device that is added as an enforcement point for a previously specified AppliedTo firewall rule in the data storage 1125). The distribution engine then distributes (e.g., through push or pull actions) the updated AppliedTo memberships and/or newly added firewall rules to the affected firewall-enforcing devices.

Figure 14:
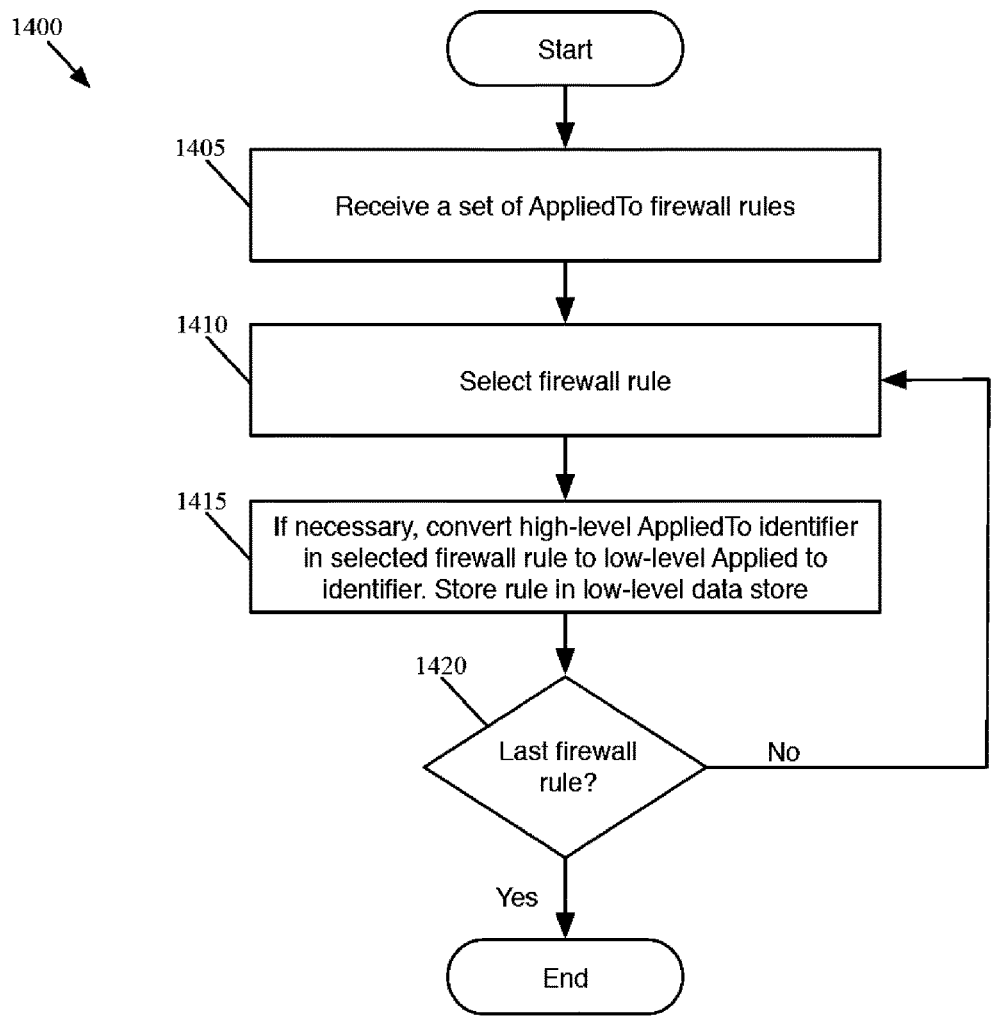
FIGS. 14-17 illustrate processes for several operations of the controller of FIG. 13 in some embodiments.

The operation of the controller 1300 in some embodiments will now be described. FIG. 14 illustrates a process 1400 that the translation engine 1410 of the controller 1400 performs in some embodiments. The process 1400 in some embodiments is performed each time a set of AppliedTo firewall rules are stored in the high-level data storage 1120. In some embodiments, the process 1400 is performed as a batch process, while in other embodiments it is performed in real-time upon receiving a notification of the storage of the set of AppliedTo firewall rules in the high-level data storage 1120.

As shown in FIG. 14, the process initially receives (at 1405) the identity of the set of AppliedTo firewall rules that have been added to the high-level data storage. These rules may be specified in terms of high-level AppliedTo identifiers (e.g., high-level compute constructs, network constructs, and/or security groups) or low-level AppliedTo identifiers (e.g., VNIC and wildcard values).

The process then selects (at 1410) one of the AppliedTo firewall rules in the received set. Next, at 1415, the process determines whether the selected AppliedTo firewall rule has an AppliedTo identifier that is defined in terms of at least one high-level construct. If so, the process converts (at 1415) the high-level AppliedTo identifier to a low-level Applied to identifier. To convert high-level AppliedTo identifiers (e.g., the high-level network construct, compute construct, and security groups) to low-level AppliedTo identifiers (e.g., to VNIC and wildcard values), the process 1400 relies on the definitions of the high-level groups that are stored in the group definition data storage 1340. Specifically, for AppliedTo identifiers that are defined by reference to groups defined in the data storage, the process 1400 (1) uses the group definitions in the data storage 1340 to identify the low-level identifiers (e.g., the VNIC and wildcard values) associated with the high-level identifiers, (2) substitutes the high-level identifiers in the AppliedTo firewall rule with the identified low-level identifiers, and (3) stores the resulting rules in the data storage 1125. At 1415, the process in some embodiments translates other parameters (e.g., source and destination identifiers) of the firewall rules (from the data storage 1320) before storing the translated rules in the data storage 1325.

At 1420, the process determines whether it has examined all the AppliedTo firewall rules in the set received at 1405. If not, the process returns to 1410 to select another AppliedTo firewall rule, and then performs the operation 1415 to translate this rule to a lower-level rule, if such a translation is necessary. When the process determines (at 1420) that it has examines all the AppliedTo firewall rules in the received set, it ends.

In this manner, the process 1400 converts high-level compute constructs (e.g., datacenter identifiers, compute cluster identifiers, host identifiers, etc.), network constructs (e.g., LFE identifiers, logical network identifiers, etc.), and security groups (formed by one or more network or compute constructs) in the AppliedTo firewall rule, into low-level identifiers (e.g., VNIC and wildcard values). In so converting the enforcement point identifiers, the translation process 1400 ensures that all AppliedTo firewall rules are defined by low-level enforcement point identifiers that can be deciphered by all firewall-enforcing devices that receive the AppliedTo firewall rules.

Figure 15:
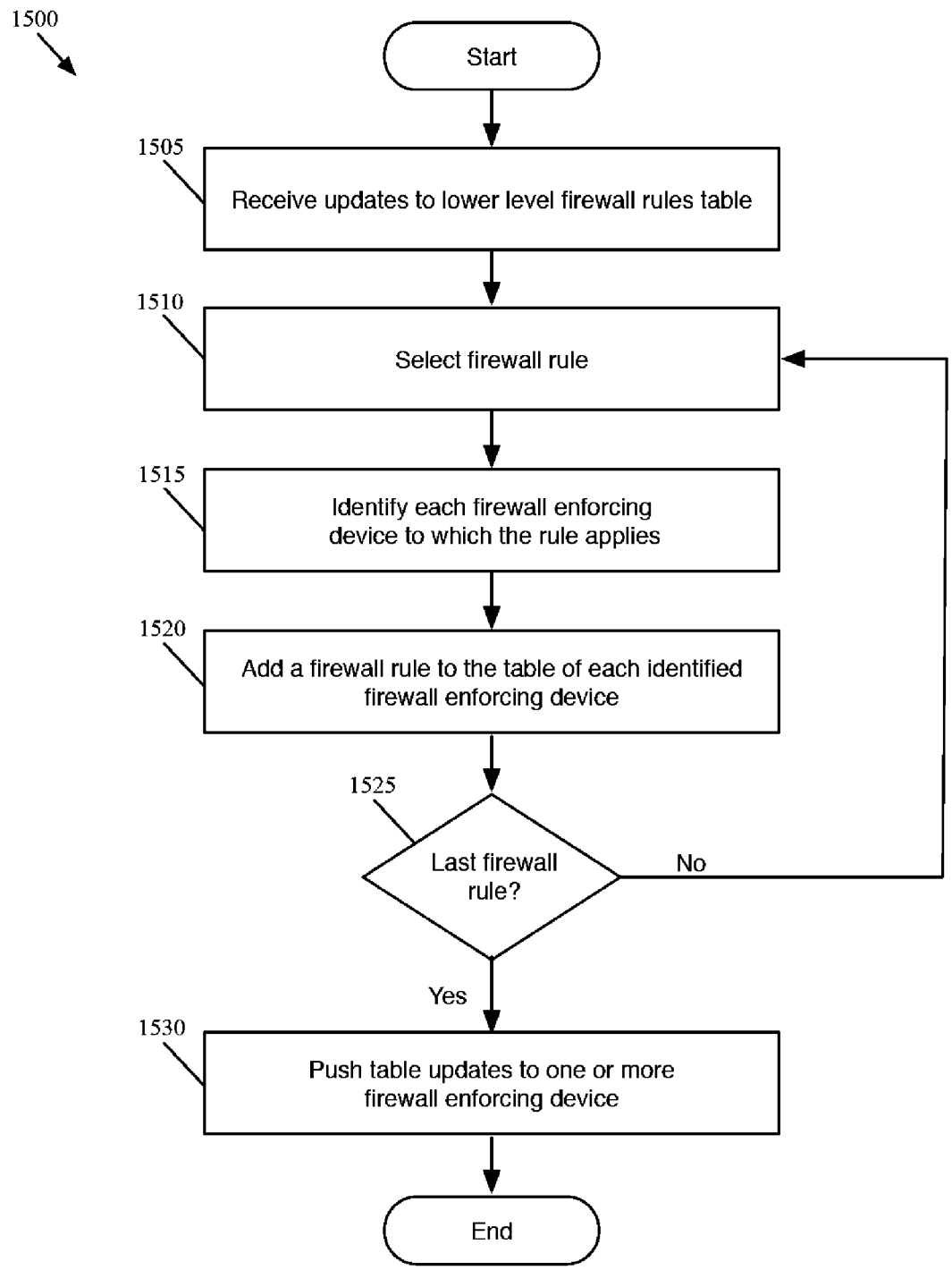

FIG. 15 illustrates a process 1500 that the publishing engine 1315 of the controller 1300 performs in some embodiments. In some embodiments, the process 1500 is performed each time a set of AppliedTo firewall rules are stored in the low-level data storage 1125. This process 1500 collects and distributes host-level AppliedTo rules 1345 from the low-level rule data storage 1125. In some embodiments, the process 1500 is performed as a batch process, while in other embodiments it is performed in real-time upon receiving a notification of the storage of a set of AppliedTo firewall rules in the low-level data storage 1125.

As shown in FIG. 15, the process initially receives (at 1505) the identity of the set of AppliedTo firewall rules that have been added to the low-level data storage. In some embodiments, the AppliedTo data tuples of these rules are specified in terms of VNIC and wildcard values. The process then selects (at 1510) one of the AppliedTo firewall rules in the received set.

Next, at 1515, the process identifies each firewall-enforcing device to which the selected rule applies. This rule extraction operation 1515 is based on the value(s) specified by the AppliedTo identifier of the selected rule. For instance, in some embodiments, the rule extractor 1350 examines each value specified by the AppliedTo identifier of the selected rule to identify the firewall-enforcing device that is related to the examined value (e.g., to identify hypervisor firewall engine or to identify a host that is related to a VNIC value specified by an AppliedTo identifier).

In some embodiments, only one firewall-enforcing device is related to any one non-wildcard AppliedTo value. In other embodiments, however, more than one firewall-enforcing device can be related to an AppliedTo value because multiple firewall-enforcing devices may connect at different times to a data end node specified by the AppliedTo value. Because of this, the publishing engine distributes a firewall rule for the data end node to each firewall-enforcing device that may connect to the data end node. For instance, when a particular host belongs to a compute cluster that implements a particular logical network on which a particular VM is connected, the rule extraction operation 1515 of some embodiments identifies a host as being related to the particular VM's VNIC that is specified by an AppliedTo value, even before the VM is instantiated on the particular host. This is because in these embodiments all the hosts in a compute cluster receive the firewall rules for the VMs connected to the logical network so that any host can configure on the fly the firewall rule table for a VM when the VM is instantiated on the host.

Next, for each firewall-enforcing device that the process 1500 identified at 1515, the process adds (at 1520) the firewall rule selected at 1510 to a firewall rule data storage that the process maintains for the firewall-enforcing device. These firewall-enforcing device data storages are typically much smaller than the high-level and low-level data storages 1120 and 1125, because the enforcing-device data storages contain only AppliedTo rules that pertain to their respective enforcing device. When adding some of the AppliedTo firewall rules to the data storages for some of the firewall-enforcing devices, the process 1500 removes the AppliedTo identifier from the rule in some embodiments. The circumstances under which some embodiments remove the AppliedTo identifier were described above in the description of the operation of the publishing engine 1315.

At 1525, the process determines whether it has examined all the AppliedTo firewall rules in the set received at 1505. If not, the process returns to 1510 to select another AppliedTo firewall rule, and then performs the operations 1515-1525 for this newly selected AppliedTo firewall rule. When the process determines that it has examined all the AppliedTo firewall rules in the received set, the process 1500 (at 1530) pushes (through a network) to each firewall-enforcing device the firewall rules that it stored (at 1520) in the data storage of the firewall-enforcing device. After 1530, the process ends.

While the rule extraction and distribution process 1500 was described above by reference to numerous details, one of ordinary skill will realize that this process can be implemented differently in other embodiments. For instance, instead of pushing the firewall rules to the enforcing devices, the firewall-enforcing devices pull the firewall rules from the publishing engine in other embodiments.

Also, as mentioned above, the process 1500 in some embodiments examines each AppliedTo value of each firewall rule to identify the enforcing device data storage that should store the firewall rule. Instead of examining each value specified by the AppliedTo identifier of a low-level firewall rule, the rule extraction operation 1515 in some embodiments associates some or all of the firewall rules to the firewall-enforcing devices by associating the high-level or low-level AppliedTo identifiers of the firewall rules in the high-level data storage 1120 with one or more firewall-enforcing devices. While using the AppliedTo identifiers (e.g., high or low level identifiers) in the high-level data storage 1120 to associate the firewall rules with the firewall-enforcing devices, some embodiments push to the firewall-enforcing devices (1) the low-level AppliedTo identifiers that are stored in the high-level data storage 1120, and (2) the low-level AppliedTo identifiers (e.g., from the group-definition storage 1340) that correspond to the high-level AppliedTo identifiers that are identified in the high-level data storage 1120.

Also, instead of defining and maintaining data storages for all firewall-enforcing devices individually, the rule extraction operation 1515 aggregates the firewall rules for at least one group of related firewall-enforcing devices in one data storage in some embodiments. For instance, in some embodiments, all hosts of one compute cluster in a datacenter receive the same set of firewall rules because each host in the compute cluster needs to be prepared to implement each logical switch that is implemented by any one host in the compute cluster. Accordingly, for all hosts in one compute cluster, the process 1500 in some embodiments creates just one compute-cluster data storage 1355 that contains all the firewall rules for all the hosts in that cluster.

Figure 16:
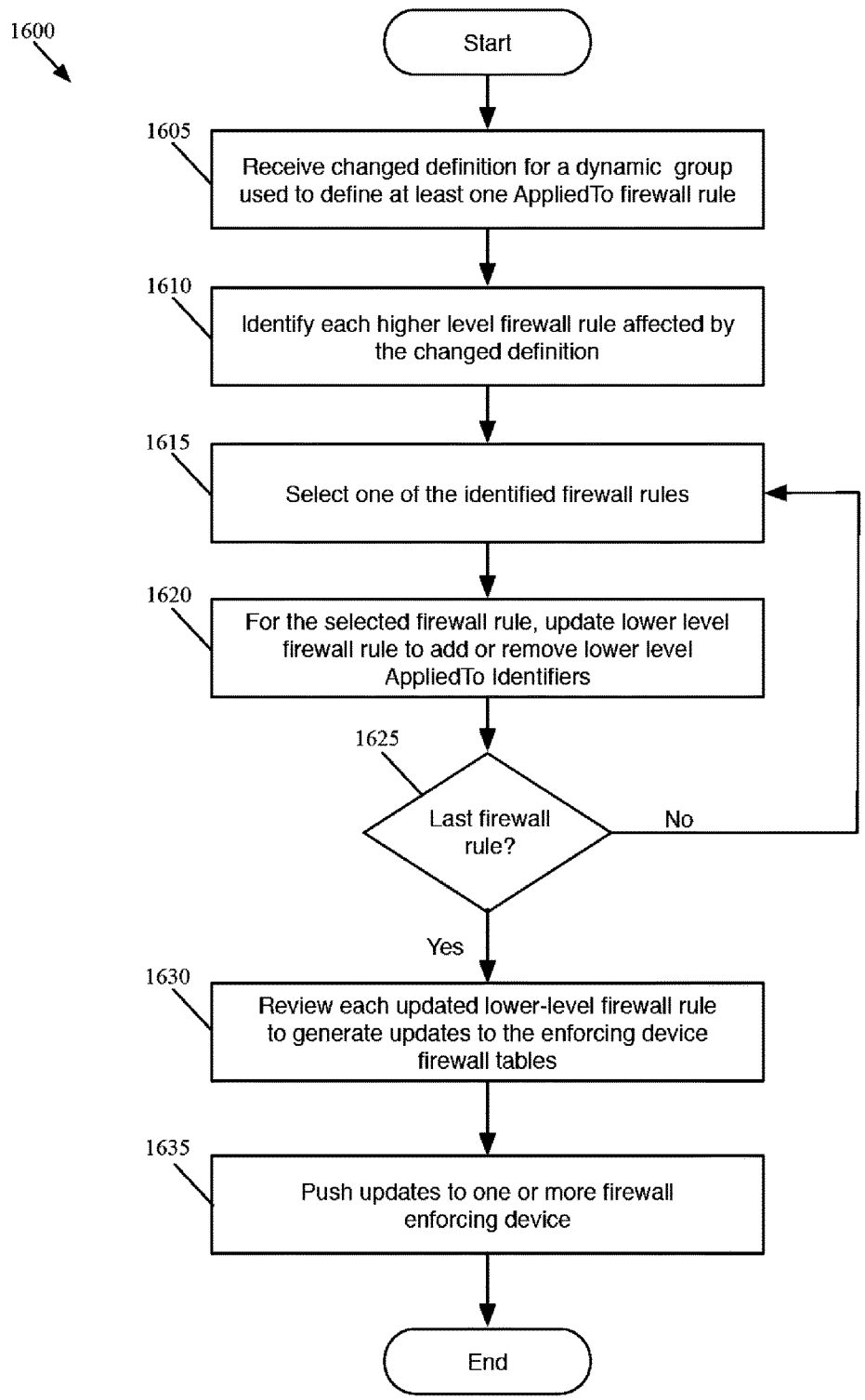

FIG. 16 illustrate a process 1600 that the controller 1300 performs in some embodiments to update the AppliedTo values of firewall rules when the membership of a dynamic construct that is used to define an AppliedTo identifier is modified. The process 1600 sends updated membership change for the affected firewall rule(s) to any firewall-enforcing devices that need to be informed of this membership change. The process 1600 also sends an affected firewall rule to a new firewall-enforcing device, or removes the affected firewall rule from a firewall-enforcing device, when the membership change to a dynamic grouping construct requires the addition or removal of a firewall-enforcing device.

The process 1600 will be explained by reference to an example illustrated in FIG. 17. This example illustrates the creation of AppliedTo firewall rules in the high- and low-level data storages 1120 and 1125 based on a dynamic security group SGZ, and the modification of the AppliedTo firewall rule in the low-level data storage 1125 after a modification to the membership of the security group SGZ.

As shown in FIG. 16, the process 1600 starts when it is notified (at 1605) of the modification to the definition of a dynamic construct (e.g., a network construct, a compute construct, or a security group) that is used to define the AppliedTo identifier of one or more AppliedTo rules in the high-level data storage 1120. As mentioned above, the group-definition data storage stores the definition of the dynamic constructs in some embodiments. In some of these embodiments, a user (through the UI module 1330) or the automated provisioning module 1335 can modify the definition of a dynamic construct at 1605. Also, in some embodiments, the group-definition storage 1340 provides (at 1605) a callback to the translation engine, in order to notify this engine of a modification to a definition of a dynamic construct.

At 1610, the process identifies each high-level firewall rule that is affected by the changed definition of the dynamic construct. This is because one dynamic construct can be used in multiple AppliedTo identifiers of multiple AppliedTo firewall rules in the high-level data storage 1120. The process 1600 then selects (at 1615) one of the high-level firewall rules identified at 1610. For the selected high-level firewall rule, the process 1600 then updates (at 1620) its corresponding lower-level firewall rule in the lower-level data storage 1125 to reflect the change to the definition of the dynamic construct. This update may result in the addition or removal of one or more low-level AppliedTo identifiers from the corresponding lower-level firewall rule.

Figure 17:
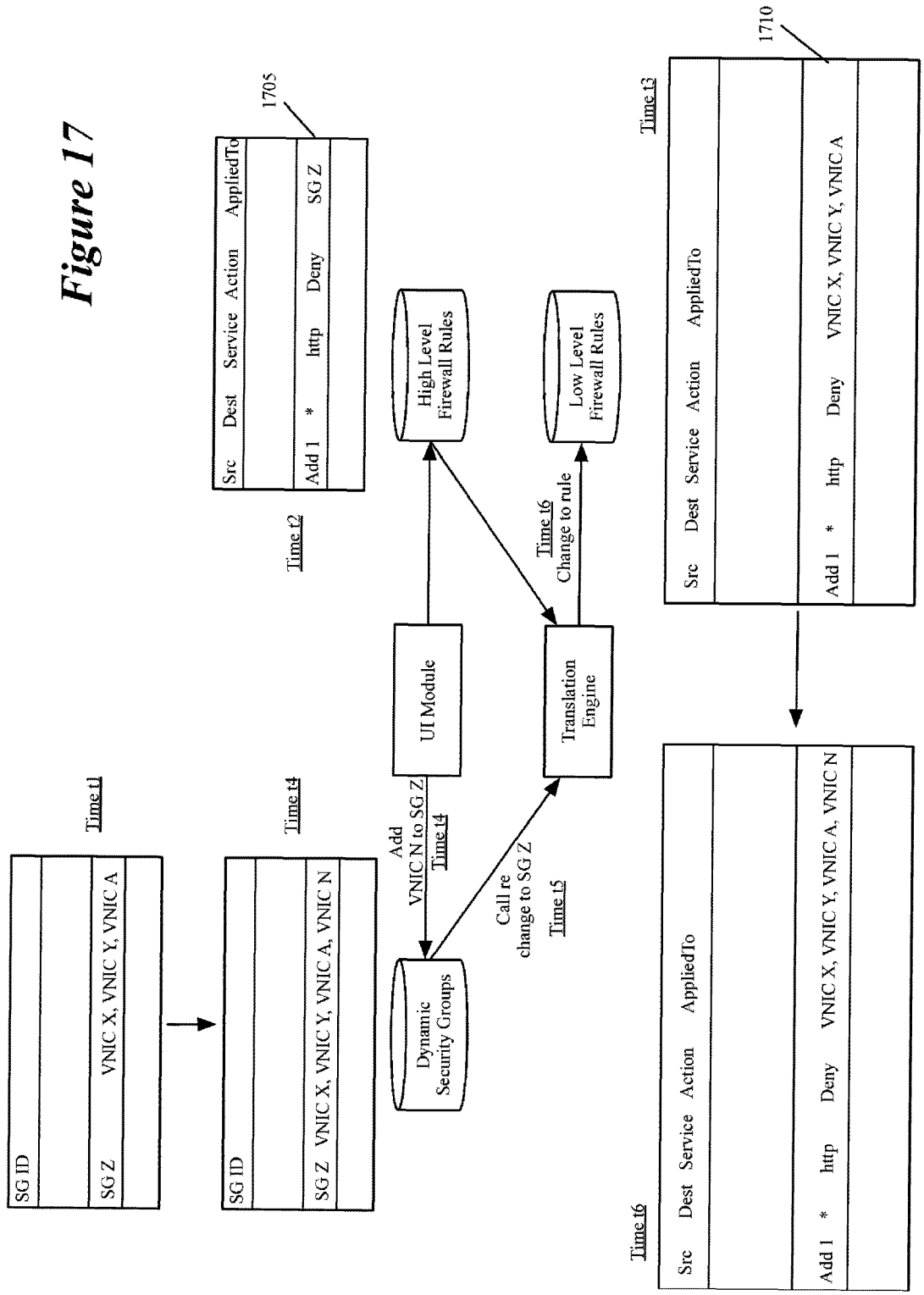

FIG. 17 illustrates an example that reflects the addition of a VNIC (called VNIC N) to a low-level firewall rule after this VNIC has been added to the definition of the security group SGZ. As shown in this figure, before VNIC N is added to the definition of the security group SGZ, the security group is defined (at time t1), a high-level rule 1705 is created by reference to this group SGZ in the high-level data storage 1120 (at time t2), and a low-level rule 1710 is created for the high-level rule 1705 in the low-level data storage 1125 (at time t3). Once the security group SGZ is modified (at time t4) to include the VNIC N, the translation engine is notified (at time t5) of this change. The translation engine then identifies high-level rule 1705 as a rule that refers to the modified security group SGZ. This engine next modifies the low-level rule 1710 (at time t6) to include VNIC N in the AppliedTo identifier of this rule.

After 1620, the process determines (at 1625) whether it has examined all high-level firewall rules that it identified at 1610 (i.e., all the high-level rules that refer to the modified dynamic construct). If not, the process returns to 1615 to select another identified high-level firewall rule and to update (at 1620) the low-level firewall rule corresponding to the high-level firewall rule. Otherwise, the process transitions to 1630.

At 1630, the process 1600 reviews each lower-level rule that it updated at 1620, in order to update the enforcing-device data storages (e.g., data storages 1355, 1360 and 1365) that contain the firewall rules for the firewall-enforcing devices. To perform this update, the process in some embodiments identifies the newly added or removed AppliedTo value(s) of each affected low-level firewall rule, and adds or removes this value from each enforcing-device firewall rule (in an enforcing-device data storage) that needs to be so updated. For instance, in the example illustrated in FIG. 17, the addition of the VNIC N to the lower-level firewall rule 1710 might require the addition of this VNIC to a host-level or a compute-cluster level data storage that stores the firewall rules for an affected host or compute cluster. An affected host is a host that executes or may execute a VM with the VNIC N, while an affected compute cluster is a compute cluster that includes such a host.

In this manner, the process (at 1630) pushes to one or more enforcing-device data storages the updated membership change to the lower-level firewall rule(s) that is caused by the change in the dynamic construct. In some cases, the change in the dynamic construct and resulting change in one or more low-level firewall rules require a firewall rule to be added to or removed from one or more enforcing-device data storages. Accordingly, in some cases, the process 1600 sends an affected firewall rule to a new firewall-enforcing device, or removes the affected firewall rule from a firewall-enforcing device, when the membership change to a dynamic grouping construct requires the addition or removal of a firewall-enforcing device.

After updating the enforcing-device data storage(s) at 1630, the process 1600 pushes (at 1635) updates to each firewall-enforcing device (through a network) which had a data storage updated at 1630 by the process 1600. When the process updates (at 1630) the AppliedTo membership of a firewall rule in an enforcing device's data storage, the process sends (at 1635) the membership change to the enforcing device. On the other hand, when the process adds (at 1630) a new firewall rule to an enforcing device's data storage, the process sends (at 1635) the firewall rule to the enforcing device. Based on the received modification, the firewall-enforcing device modifies the membership of its firewall rule, or adds or removes a firewall rule. After 1635, the process ends.

One of ordinary skill will realize that the update process 1600 is implemented differently in other embodiments of the invention. For instance, the controller 1300 in some embodiments does not maintain lower-level rules in the lower-level data storage 1125. In these embodiments, the update process uses the updated group definitions in the group-definition storage 1340 to update directly the firewall rules that it stores in the enforcing device data storages, when the membership of a dynamic construct is modified in the group-definition store.

Figure 18:
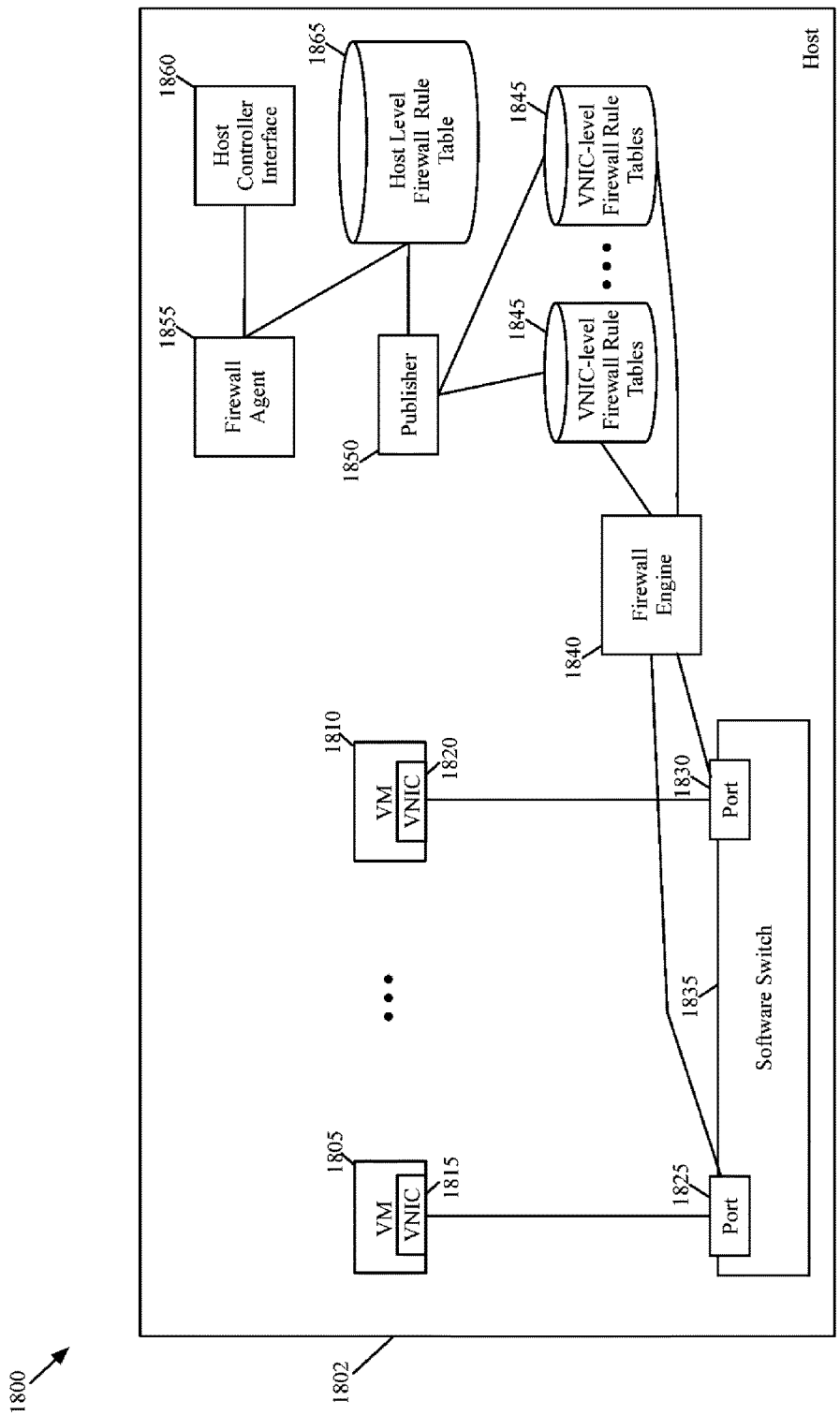
FIG. 18 illustrate the firewall enforcement architecture of a multi-VM host of some embodiments of the invention.

FIG. 18 illustrate the firewall enforcement architecture 1800 of a multi-VM host 1802 of some embodiments of the invention. This host receives AppliedTo firewall rules and based on these rules, specifies multiple VNIC-level firewall rule data storages, which it then uses to perform VNIC-level firewall operations on packets sent by, and received for, each VM.

As shown in FIG. 18, the virtualization architecture 1800 includes (1) multiple VMs 1805 and 1810, (2) a VNIC 1815 or 1820 for each VM, (3) a software switch 1835, (4) a port 1825 or 1830 for each VNIC, (5) a firewall engine 1840, (6) VNIC-level firewall rules 1845, (7) a firewall rule publisher 1850, (8) a firewall agent 1855, (9) a host-level firewall rule table 1865, and (1) a host-controller interface 1860.

In some embodiments, the VMs execute on top of a hypervisor (not shown) that is executing on the host. FIG. 18 illustrates just two VMs 1805 and 1810, but a larger number of VMs execute on the host 1802 in some cases. Each VM may belong to one tenant or to multiple tenants when the host operates in a multi-tenant environment.

Each VM includes a VNIC in some embodiments. For instance, VM 1805 includes VNIC 1815 while VM 1810 includes VNIC 1820. Each VNIC of the VM is responsible for exchanging packets between the VM and the software switch. As further described below, each VNIC connects to a particular port of the software switch, which connects to a physical NIC (not shown) of the host. In some embodiments, the VNICs are software abstractions of a physical NIC that are implemented by the virtualization software.

In some embodiments, the software switch maintains a single port 1840 for each VNIC of each VM. For instance, for VNICs 1815 and 1820, the software switch 1835 includes ports 1825 and 1830. The software switch 1835 performs packet-processing operations to forward packets that it receives on one of its ports to another one of its ports. For example, in some embodiments, the software switch tries to use data in the packet (e.g., data in the packet header) to match a packet to flow based rules, and upon finding a match, to perform the action specified by the matching rule. The software switch 1835 connects to a physical NIC (through a NIC driver (not shown)) to send outgoing packets and to receive incoming packets. In some embodiments, the software switch 1835 is defined to include a port (not shown) that connects to the physical NIC's driver to send and receive packets to and from the NIC.

Also, in some embodiments, the software switch of one host can form multiple logical switches with software switches of other hosts, with each logical switch serving a conceptual switch that services a logical network. In other words, different logical switches can be defined to specify different logical networks for different users, and each logical switch can be defined by multiple software switches on multiple hosts. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 2 Networks over Layer 3 Networks, IETF.

In some embodiments, the ports of the software switch 1835 include one or more function calls to one or more modules that implement special input/output operations on incoming and outgoing packets that are received at the ports. One of these function calls is to the firewall engine 1840, which performs in some embodiments firewall operations on incoming and/or outgoing packets (i.e., on packets that are received by the host for one of the VMs or on packets that are sent by one of the VMs). Other examples of such I/O operations include ARP broadcast suppression operations and DHCP broadcast suppression operations. Other I/O operations can be so implemented in some embodiments of the invention. By implementing a stack of such function calls, the ports can implement a chain of I/O operations on incoming and/or outgoing packets in some embodiments. Also, in some embodiments, other modules in the data path (such as the VNICs, etc.) implement the I/O function call operations (such as the firewall function calls).

As mentioned above, the firewall engine 1840 can be called (e.g., by a port 1825 or 1830 of the software switch 1835) for incoming or outgoing packets to check whether such packets should be delivered to a VM or sent from a VM based on VNIC-level firewall rules that are stored for the VM's VNIC in the VNIC-level firewall data storages 1845. In some embodiments, the firewall engine 1840 can be called by the port that connects to the physical NIC's driver (e.g., for incoming packets).

The firewall engine tries to match the received packets' identifiers (e.g., five-tuple identifiers extracted from the packet header) with the associated identifiers (e.g., five-tuple identifiers) of the firewall rules stored in the VNIC data storage 1845 of the VNIC that is the destination of an incoming packet or the source of an outgoing packet. In other words, to match a rule with a packet, the firewall engine identifies n-data tuples for a packet (e.g., extracts these tuples from the packet's header) and compares the identified tuples with the n-data tuples of each rule.

The firewall rule publisher 1850 populates and updates the VNIC-level firewall rule data storages 1845 based on the host-level AppliedTo firewall rules that are stored in the host-level firewall rule data storage 1865. In some embodiments, the publisher examines the AppliedTo identifier of each new firewall rule or updated firewall rule in the host-level firewall data storage 1865 to determine whether the rule pertains to a VNIC of one of the VMs currently instantiated on the host. Whenever the publisher 1850 identifies a new or updated rule that pertains to one such VNIC, the publisher pushes the new rule or updated rule to the VNIC's firewall rule table 1845. In pushing this rule to the VNIC's firewall rule table, the publishing engine removes the AppliedTo identifier from the firewall rule before storing the firewall rule in the VNIC's firewall rule table.

The firewall agent 1855 populates and updates the host-level firewall rule data storage 1865 based on host-level AppliedTo firewall rules that it receives from the controller through the host-controller interface 1860 and the network (not shown). As mentioned above, the controller in some embodiments pushes to each host the AppliedTo firewall rules for not only the VMs that the host is currently executing but also for the VMs that the host may execute at some later point in time. Also, as mentioned above, a host may operate as part of a compute cluster, and all hosts of the compute cluster in some embodiments are configured to support a set of tenants or logical networks, so that when a VM for one of the tenants or logical networks is instantiated on or moved to one such host, some or all of the data needed for configuring that VM on the host already exists on the host. In some such embodiments, each host in the compute cluster receives the same set of AppliedTo firewall rules, so that each host can configure on its own (without going to the controller) the VNIC firewall rule table for any possible VM that may be instantiated on or moved to the host.

In some embodiments, the software switch 1835, the firewall engine 1840, and the VNIC-level firewall rule tables 1840 operate in the kernel space, while the publisher 1850, the firewall agent 1855, the host-level firewall rule table 1865, the host-controller interface 1860 and the VMs 1805 and 1810 operate in the user space. By operating in the kernel space, the firewall engine 1840 operates faster than it would otherwise do in the user space.

Figure 19:
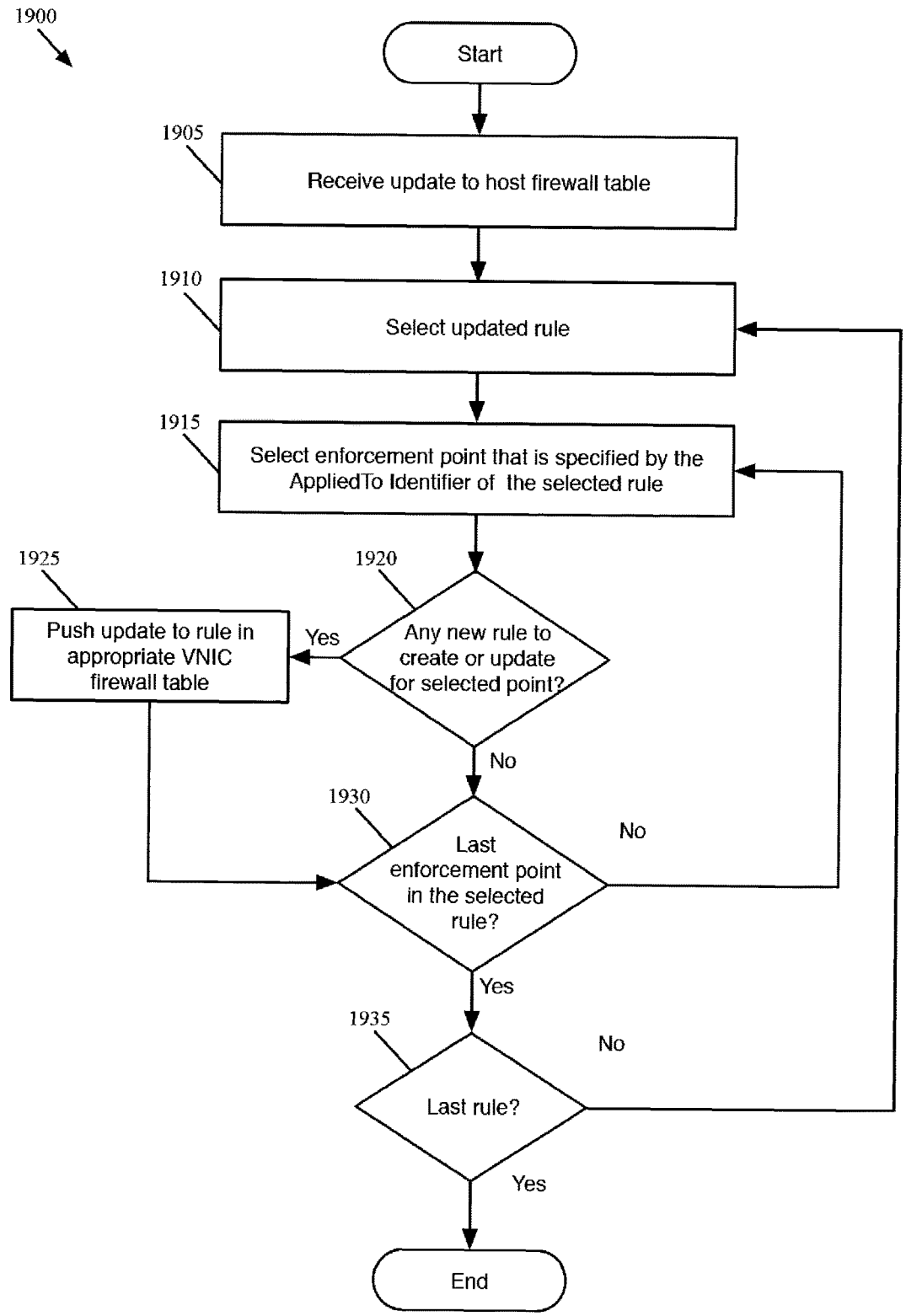
FIGS. 19-21 illustrate processes for several operations of the firewall enforcing modules of the host of FIG. 18 in some embodiments.

The operation of the host 1802 in some embodiments will now be described by reference to FIG. 19-21. FIG. 19 illustrates a process 1900 that the publisher 1850 performs in some embodiments to maintain the VNIC-level firewall tables 1845. The publisher performs this process each time that the host-level firewall rule table 1865 receives additions and/or modifications to a set of rules from a controller. In other words, the process 1900 is performed each time the firewall agent 1855 stores a new set of rules in the rule table 1865, removes a set of rules from the rule table 1865, and/or modifies a previous set of rules in the rule table 1865.

As shown in FIG. 19, the process 1900 initially receives (at 1905) a notification of an update to the host firewall table 1860. This update may add one or more rules to the table 1865, remove one or more rules from the table 1865, or modify one or more rules in the table 1865. The collection of all rules affected by this update is referred to below as the received set of updated rules. The notification in some embodiments is in the form of a callback from the data storage 1865. In other embodiments, the notification is provided by the firewall agent 1855. In still other embodiments, the publisher periodically checks the data storage 1860.

Next, at 1910, the process 1900 selects one of the rules in the set of updated rules. The process then selects (at 1915) an enforcement point that is associated with the selected rule. When the selected rule is a newly received rule, the selected enforcement point can be any one of the enforcement points identified by the AppliedTo identifier of the rule selected at 1910. When the selected rule is a rule that has been removed from the host firewall rule table 1860, the selected enforcement point can be any enforcement point that is identified by the AppliedTo identifier of the rule that is being removed. When the selected rule is a rule that was previously stored and that has its set of enforcement points modified, the enforcement point selected at 1915 is one of the enforcement points that has been added or removed by the update to the selected rule.

After 1915, the process determines (at 1920) whether any VNIC-level rule has to be added to, removed from, or updated in a VNIC-level firewall table 1845. In other words, at 1920, the process determines whether the selected enforcement point (i.e., the enforcement point selected at 1915) corresponds to a VNIC of a VM that is executing on the host. If not, the process transitions to 1930, which will be described below. Otherwise, the process pushes (at 1925) an update to the firewall rule data storage 1845 of the VNIC that corresponds to the selected enforcement point. This update adds a firewall rule to the VNIC's data storage 1845 when the selected rule is a new rule or is an updated rule that now also includes the VNIC as an enforcement point. This update removes a previous firewall rule from the VNIC's data storage 1845 when the selected rule is a rule that is being removed or is an updated rule that no longer includes the VNIC as an enforcement point. In adding a firewall rule to the VNIC's data storage 1845, the process 1900 removes (at 1825) the AppliedTo tuple from the firewall rule before adding this firewall rule to the data storage 1845.

From 1925, the process transitions to 1930. At 1930, the process determines whether it has examined all of the enforcement points that it has to examine for the rule selected at 1910. When the selected rule is a new rule to add or is a previous rule to remove, the process has to examine all the enforcement points that are specified in the AppliedTo identifier of the rule. On the other hand, when the selected rule is an update to a previous rule, the process has to examine all of the new enforcement points that are added to the rule and all of the previous enforcement points that are removed from the rule.

When the process determines (at 1930) that it has not examined all of the necessary enforcement points for the selected rule, it returns to 1915 to select another enforcement point of the selected rule that it has to examine. The process then repeats the subsequent operations to determine whether it has to make any VNIC-level rule changes and if so, to make the VNIC level rule change.

When the process determines (at 1930) that it has examined all of the necessary enforcement points for the selected rule, it determines (at 1935) whether it has examined all of the rules specified by the set of updated rules. If not, it returns to 1910 to select another one of the rules that is specified by the set of updated rules, and then repeats its operations 1915-1935 for this selected rule. When the process determines (at 1935) that it has examined all of the rules specified in by the set of updated rules, it ends.

Figure 20:
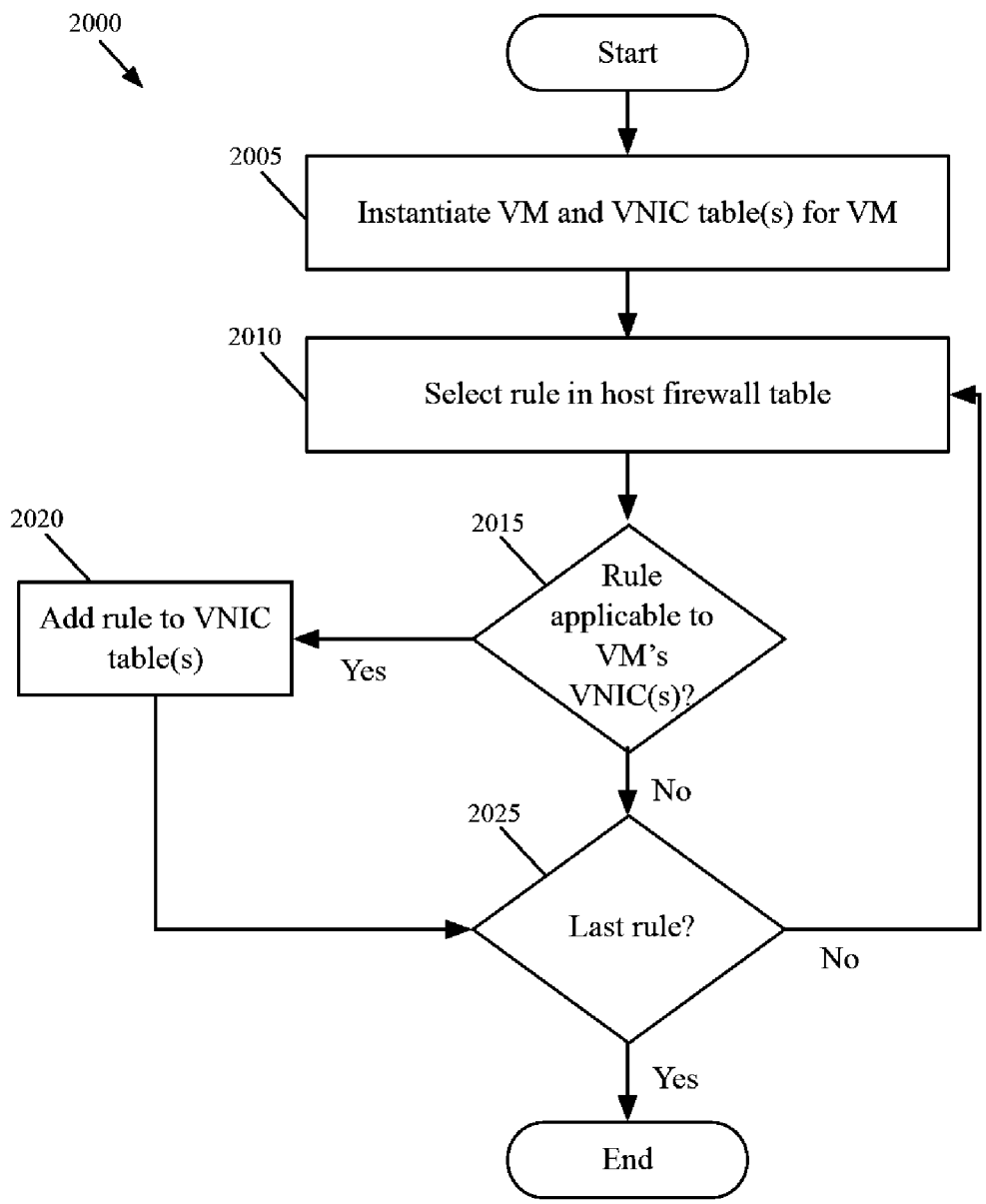

FIG. 20 illustrates a headless process 2000 that the host performs in some embodiments to configure a VNIC-level firewall table when a VM is instantiated on the host. This process is referred to as a headless process as it configures the VNIC-level firewall table without referring to a controller during the configuration of the table. The process is performed as part of the instantiation of the VM, or after the process for instantiating the VM, on the host. As shown, the process initially (at 2005) instantiates the VM and specifies a VNIC-level table for the VM's VNIC. Next, the process selects (at 2010) a firewall rule in the host-firewall rule table 1865.

The process determines (at 2015) whether the selected rule is applicable to the instantiated VM's VNIC. In other words, the process determines whether the AppliedTo identifier of the selected rule identifies the VNIC as one of the enforcement points of the selected firewall rule. When the selected firewall rule is not applicable to the instantiated VM's VNIC (i.e., when the rule's AppliedTo identifier does not identify this VNIC), the process transitions to 2025, which will be explained below.

When the selected firewall rule's AppliedTo identifier identifies the instantiated VM's VNIC, the process adds (at 2020) the selected firewall rule to the VNIC's firewall data storage 1845. In adding this selected firewall rule to the VNIC-level firewall data storage 1845, the process 2000 removes the AppliedTo tuple from the firewall rule. From 2020, the process transitions to 2025.

At 2025, the process determines whether it has examined all the AppliedTo rules in the host-level firewall rule data storage 1865. If not, it returns to 2015 to select another rule, and then repeats its subsequent operations for this selected rule. When the process determines (at 2025) that it has examined all of the AppliedTo rules, it ends.

Figure 21:
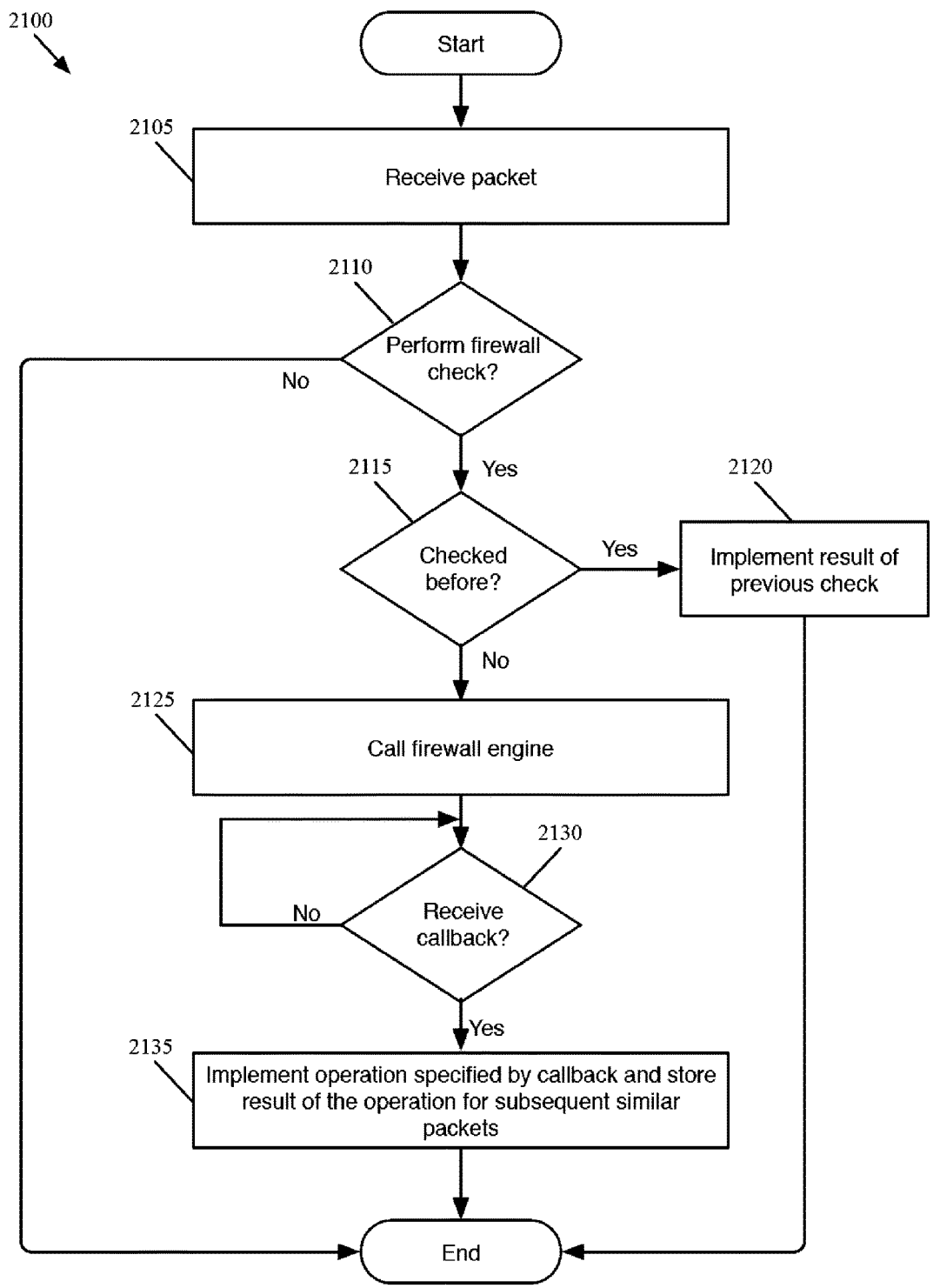

FIG. 21 illustrates a process 2100 that a port of the software switch 1835 performs in some embodiments to enforce firewall rules on a packet that it receives. In some embodiments, the port performs this operation for both incoming and outgoing packets. In other embodiments, the port performs this operation for either only the incoming packets or only the outgoing packets. In still other embodiments, one port (e.g., the port that connects to a VM's VNIC) of the switch performs this operation for outgoing packets, while another port (e.g., the port that connects the software switch to the physical NIC, e.g., through the NICs driver) performs this operation for incoming packets. By checking both incoming and outgoing packets, the process 2100 can enforce AppliedTo firewall rules at both source and destination of packets.

As shown in FIG. 21, the process initially receives (at 2105) a packet. It then determines (at 2110) whether it should perform firewall check for the received packet. In some embodiments, the process makes this determination by determining whether the firewall feature has been enabled for the VNIC that is the source of an outgoing packet or the destination of an incoming packet. If the firewall feature has not been enabled, the process ends.

Otherwise, the process determines (at 2115) whether it previously checked the firewall rules for a packet with identical firewall attribute tuples as the received packet. The firewall engine identifies a firewall rule for a packet based on n-tuples that are retrieved from the packet's header (e.g., the packet's five tuples: source, source port, destination, destination port, and service). Two packets have identical firewall attributes when their n-tuples match. As mentioned below, the process 2100 in some embodiments stores the action that it performs on a particular packet after identifying the firewall rule for the packet, so that it can subsequently perform this action again on packets that are identical to the particular packet.

When the process determines (at 2115) that it has previously checked the firewall rules for an identical packet, it transitions to 2120 to perform the operation (e.g., drop or allow) that was the result of the previous check, and then ends. It should be noted that other embodiments, however, do not store the action that is performed. In these embodiments, the process would not perform the check at 2115 and would transition from 2110 to 2125 when it determines (at 2110) that it has to perform a firewall check on a packet. Alternatively, other embodiments that store the actions that are specified by prior firewall rule checks of the firewall engine 1840, have the firewall engine store these actions in a connection state data storage that the firewall engine maintains for all of the VMs (e.g., stores the prior actions for each port in a connection state table for that port). In these embodiments, the check 2115 for the prior firewall rule and the subsequent operation 2120 based on the prior check, are performed by the firewall engine 1840. In these embodiments, the process 2100 would transition from 2110 to 2125 when it determines (at 2110) that it has to perform a firewall check on a packet, and the firewall rule engine 1840 would perform the check 2115.

When the process 2100 determines (at 2115) that it has not previously checked the firewall rules for an identical packet, it passes the n-tuples of the received packet (i.e., the packet received at 2105) to the firewall engine. With the n-tuples, the firewall engine checks the VNIC-level firewall table 1845 of the VNIC that is the source of an outgoing packet or the destination of an incoming packet to determine what action needs to be done on the received packet. In some embodiments, the VNIC-level firewall table has a catchall rule that ensures that each packet matches at least one rule (i.e., the catchall rule) when it does not match any other rule in the firewall table. Also, in some embodiments, the rules in the firewall rule table are arranged in a hierarchical way, and the rule check is performed according to the hierarchy, to ensure that a packet matches a higher priority rule before matching a lower priority rule when the packet can match more than one rule.

After 2125, the process transitions to 2130, where it waits until it receives a callback from the firewall engine. In some embodiments, the firewall engine's callback either specifies that the packet should be allowed to pass through or it should be dropped. When the process receives the engine's callback, the process transitions to 2135 to perform the action according to the engine's callback. In other words, the process in some embodiments drops the packet when the callback specifies that the packet should be dropped. On the other hand, the process allows the packet to pass through when the callback specifies that the packet should be allowed. It should be noted that in some embodiments the port might not allow a packet to pass through even when the callback specifies that the packet should be allowed to pass through, because some other function might direct the port to drop the packet.

At 2135, the process also stores the operation that the firewall engine specified so that this operation can be used subsequently at 2120, when the port receives a packet that is identical to the received packet. After 2135, the process ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
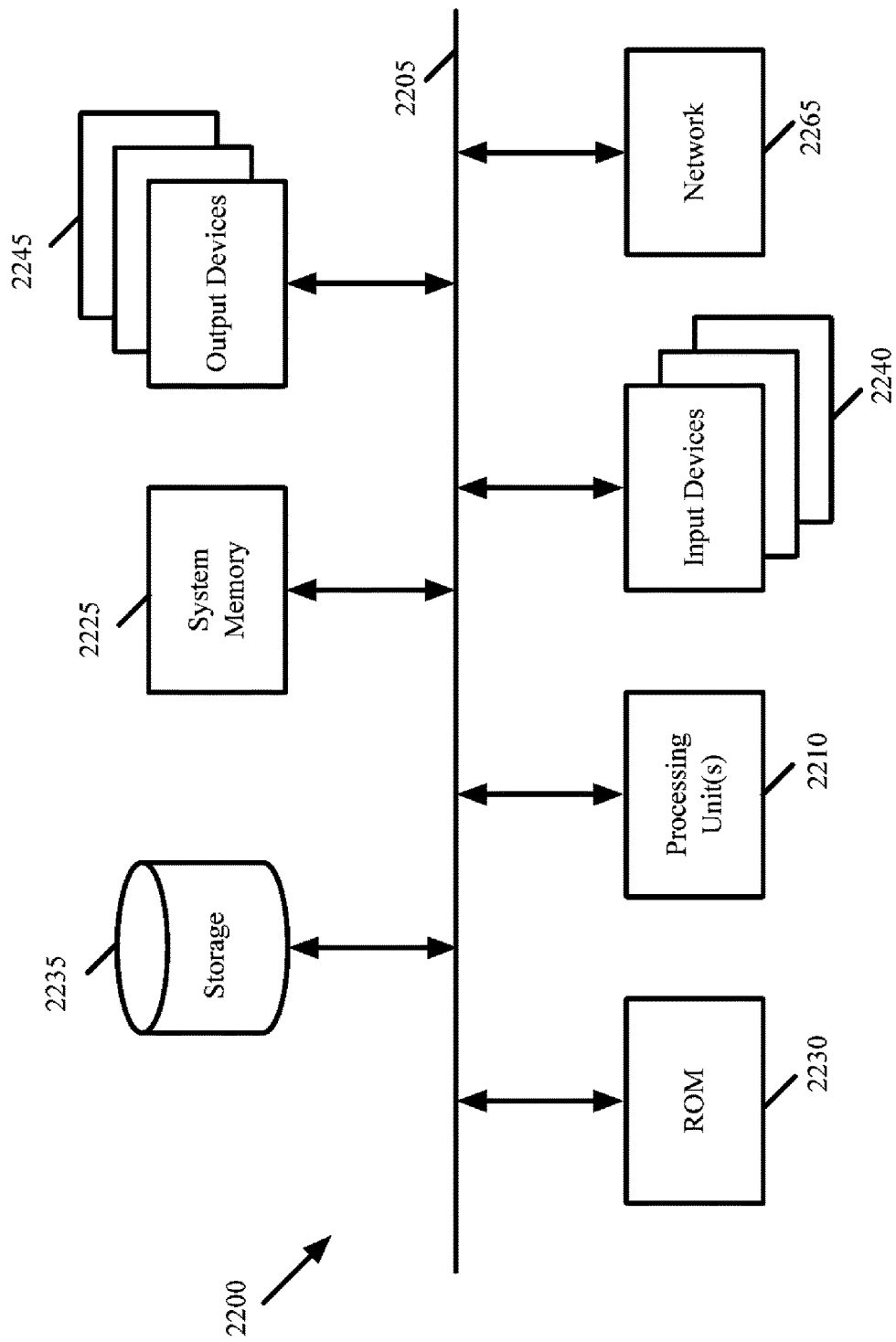
FIG. 22 conceptually illustrates an electronic system with which some embodiments of the invention are implemented.

FIG. 22 conceptually illustrates an electronic system 2200 with which some embodiments of the invention are implemented. The electronic system 2200 can be used to execute any of the control, virtualization, or operating system applications described above. The electronic system 2200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2200 includes a bus 2205, processing unit(s) 2210, a system memory 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the system memory 2225, and the permanent storage device 2235.

From these various memory units, the processing unit(s) 2210 retrieve instructions to execute and data to process in order to execute the processes of the invention. The processing unit(s) may be a single processor or a multi-core processor in different embodiments.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash drive, etc.) as the permanent storage device. Like the permanent storage device 2235, the system memory 2225 is a read-and-write memory device. However, unlike storage device 2235, the system memory is a volatile read-and-write memory, such a random access memory. The system memory stores some of the instructions and data that the processor needs at runtime. In some embodiments, the invention's processes are stored in the system memory 2225, the permanent storage device 2235, and/or the read-only memory 2230. From these various memory units, the processing unit(s) 2210 retrieve instructions to execute and data to process in order to execute the processes of some embodiments.

The bus 2205 also connects to the input and output devices 2240 and 2245. The input devices enable the user to communicate information and select commands to the electronic system. The input devices 2240 include alphanumeric keyboards and pointing devices (also called "cursor control devices"). The output devices 2245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 22, bus 2205 also couples electronic system 2200 to a network 2265 through a network adapter (not shown). In this manner, the computer can be a part of a network of computers (such as a local area network ("LAN"), a wide area network ("WAN"), or an Intranet, or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures (including FIGS. 8, 14-16, and 19-21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which the controller aggregates firewall rule sets for distribution into host-level or compute-cluster level data storages, before distributing the rules sets to different hosts or different sets of hosts in different clusters. Other embodiments, however, extract the rules differently. For instance, in some embodiments, the rule extractor initially groups the rule into different sets that are for different logical network constructs (e.g., logical switches, logical routers, logical networks, etc.). To distribute these rule sets, the controller (e.g., the rule extractor or rule distributor) then distributes the rules sets for the different logical network constructs to different hosts or compute clusters that implement the logical network constructs.

This specification refers throughout to computational and network environments that include virtual machines (VMs). However, virtual machines are merely one example of a data compute node (DCN), also referred to as data compute end node or addressable nodes. Some embodiments of the invention are equally applicable to any computing node that utilizes a port abstraction defined on a host computing device to allow multiple programs that execute on the host to share common resources on the host. As such, the compute nodes in some embodiments may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc. One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments. In view of the foregoing, one of ordinary skill in the art would understand that the invention is not to be limited by the foregoing illustrative details, but rather is to be defined by the appended claims.

We claim:

1. A datacenter comprising:
 a plurality of host computing devices for executing a plurality of data compute nodes;

a first set of controllers for provisioning the data compute nodes;

a plurality of different firewall devices; and a second of set of controllers for providing a management console to search and modify firewall rules for the different firewall devices, wherein the management console (i) displays a plurality of firewall rules enforced by the plurality of firewall devices and (ii) after receiving a set of filtering criteria, displays a subset of the plurality of firewall rules that satisfy the set of filtering criteria.

2. The datacenter of claim 1, wherein the management console is further for defining firewall rules.

3. The datacenter of claim 2, wherein the management console is further for distributing the firewall rules to the firewall devices.

4. The datacenter of claim 1, wherein each set of controller comprises one or more controllers.

5. The datacenter of claim 1 further comprising
a plurality of forwarding elements; and
a third set of controllers for configuring the forwarding elements.

6. The datacenter of claim 5, wherein the second and third set of controllers are the same set of controllers.

7. The datacenter of claim 1, wherein the firewall devices comprise different types of firewall devices.

8. A datacenter comprising:
a plurality of host computing devices for executing a plurality of data compute nodes;
a first set of controllers for provisioning the data compute nodes;
a plurality of different firewall devices comprising firewall engines executing on host computing devices, network perimeter firewall devices, and firewall appliances; and
a second of set of controllers for providing a management console to search and modify firewall rules for the different firewall devices.

9. The datacenter of claim 8, wherein
at least one network perimeter firewall device is a stand-alone device that executes a firewall engine without executing any compute end node, and
at least one firewall appliance is an application firewall gateway.

10. The datacenter of claim 9, wherein the application firewall gateway performs deep packet inspection and enforces firewall rules that are defined in terms of L7 data message header values.

11. A datacenter comprising:
a plurality of host computing devices for executing a plurality of data compute nodes;
a first set of controllers for provisioning the data compute nodes;
a plurality of different firewall devices comprising firewall devices from different vendors; and
a second of set of controllers for providing a management console to search and modify firewall rules for the different firewall devices.

12. A datacenter comprising:
a plurality of host computing devices for executing a plurality of data compute nodes;
a first set of controllers for provisioning the data compute nodes;
a plurality of different firewall devices; and
a second of set of controllers for providing a management console to search and modify firewall rules for the different firewall devices, wherein the management console serves as a single interface for receiving, modifying, filtering, and debugging firewall rules for the plurality of different firewall devices in the data center.

13. A datacenter comprising:
a plurality of host computing devices for executing a plurality of data compute nodes;
a first set of controllers for provisioning the data compute nodes;
a plurality of different firewall devices; and
a second of set of controllers for providing a management console to search and modify firewall rules for the different firewall devices, wherein the management console comprises a first section for displaying firewall rules that are defined by reference to L3 parameters, and a second section for displaying firewall rules by reference to L2 parameters.

14. A datacenter comprising:
a plurality of host computing devices for executing a plurality of data compute nodes;
a first set of controllers for provisioning the data compute nodes;
a plurality of different firewall devices; and
a second of set of controllers for providing a management console to search and modify firewall rules for the different firewall devices, wherein the firewall management console comprises a first section for displaying firewall rules that are defined for re-directing data messages to one or more third party appliances that perform one or more security services in the datacenter, and a second section for displaying firewall rules that are enforced by other firewall devices in the datacenter.

15. A datacenter comprising:
a plurality of host computing devices for executing a plurality of data compute nodes;
a first set of controllers for provisioning the data compute nodes;
a plurality of different firewall devices; and
a second of set of controllers for providing a management console to search and modify firewall rules for the different firewall devices, wherein each firewall rule includes a tuple for defining a set of firewall devices for enforcing the firewall rule.

16. The datacenter of claim 15, wherein at least each of a plurality of tuples for each of a plurality of firewall rules defines the set of firewall devices by reference to a high level group construct, which has to be resolved into one or more lower level constructs that define the firewall devices for enforcing the firewall rule.

* * * * *